United States Patent
Chen et al.

(10) Patent No.: US 12,298,961 B1
(45) Date of Patent: May 13, 2025

(54) INCREASING COMMIT TIMES AT DATABASE SHARDS FOR IMPLEMENTING CONSISTENCY AND ISOLATION FOR DISTRIBUTED TRANSACTIONS

(71) Applicant: Amazon Technologies, Inc., Seattle, WA (US)

(72) Inventors: Jin Chen, Toronto (CA); Anand Kumar Thakur, Snohomish, WA (US); Upendra Govindagowda, Renton, WA (US); Gaurav Kumar Gupta, Waterloo (CA); David Charles Wein, Shoreline, WA (US); Saleem Mohideen, Saratoga, CA (US); Alexandre Olegovich Verbitski, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/478,069

(22) Filed: Sep. 29, 2023

(51) Int. Cl.
G06F 17/00 (2019.01)
G06F 7/00 (2006.01)
G06F 16/23 (2019.01)

(52) U.S. Cl.
CPC ................................ *G06F 16/2322* (2019.01)

(58) Field of Classification Search
CPC .................................................. G06F 16/2322
USPC ........................................................ 707/703
See application file for complete search history.

(56) References Cited

U.S. PATENT DOCUMENTS

| | | | |
|---|---|---|---|
| 10,346,386 B2 | 7/2019 | Chatterjee et al. | |
| 10,409,864 B2 | 9/2019 | Schreter et al. | |
| 12,013,834 B1* | 6/2024 | Chen | G06F 16/2322 |
| 2009/0132535 A1* | 5/2009 | Surtani | G06F 16/2329 707/999.008 |
| 2015/0261805 A1* | 9/2015 | Lee | G06F 16/2329 707/703 |
| 2018/0129693 A1* | 5/2018 | Chatterjee | G06F 16/2329 |
| 2018/0203888 A1 | 7/2018 | Wen et al. | |
| 2019/0171763 A1* | 6/2019 | Cai | G06F 16/278 |
| 2023/0409573 A1* | 12/2023 | Aluc | G06F 16/24542 |

* cited by examiner

*Primary Examiner* — Pavan Mamillapalli
(74) *Attorney, Agent, or Firm* — S. Scott Foster; Kowert, Hood, Munyon, Rankin & Goetzel, P.C.

(57) ABSTRACT

Clock times may be stored at nodes of a database system that are used to provide access to database data using Multi-Version Concurrency Control (MVCC) and implement isolation for distributed transactions. When an access request is received at a processing node of a database, the snapshot time of the access request is determined. The snapshot may be a range of time, with an earliest and latest timestamp. If the snapshot time has a latest time stamp greater than a current timestamp in the clock time, then the clock time may be updated. The clock time and snapshot time may be used to implement time-based MVCC to select a version of a tuple stored in the database to use for performing the access request.

20 Claims, 14 Drawing Sheets

INCREASING COMMIT TIMES AT DATABASE SHARDS FOR IMPLEMENTING CONSISTENCY AND ISOLATION FOR DISTRIBUTED TRANSACTIONS

BACKGROUND

Commoditization of computer hardware and software components has led to the rise of service providers that provide computational and storage capacity as a service. At least some of these services (e.g., managed services such as managed relational database services) may be distributed in order to scale the processing capacity of the service and increase service availability. Because distributed systems may be disrupted due network and other failure scenarios, resiliency to handle these various failure scenarios may be implemented to prevent disruption of client systems or applications that utilize these services.

Figure 1:
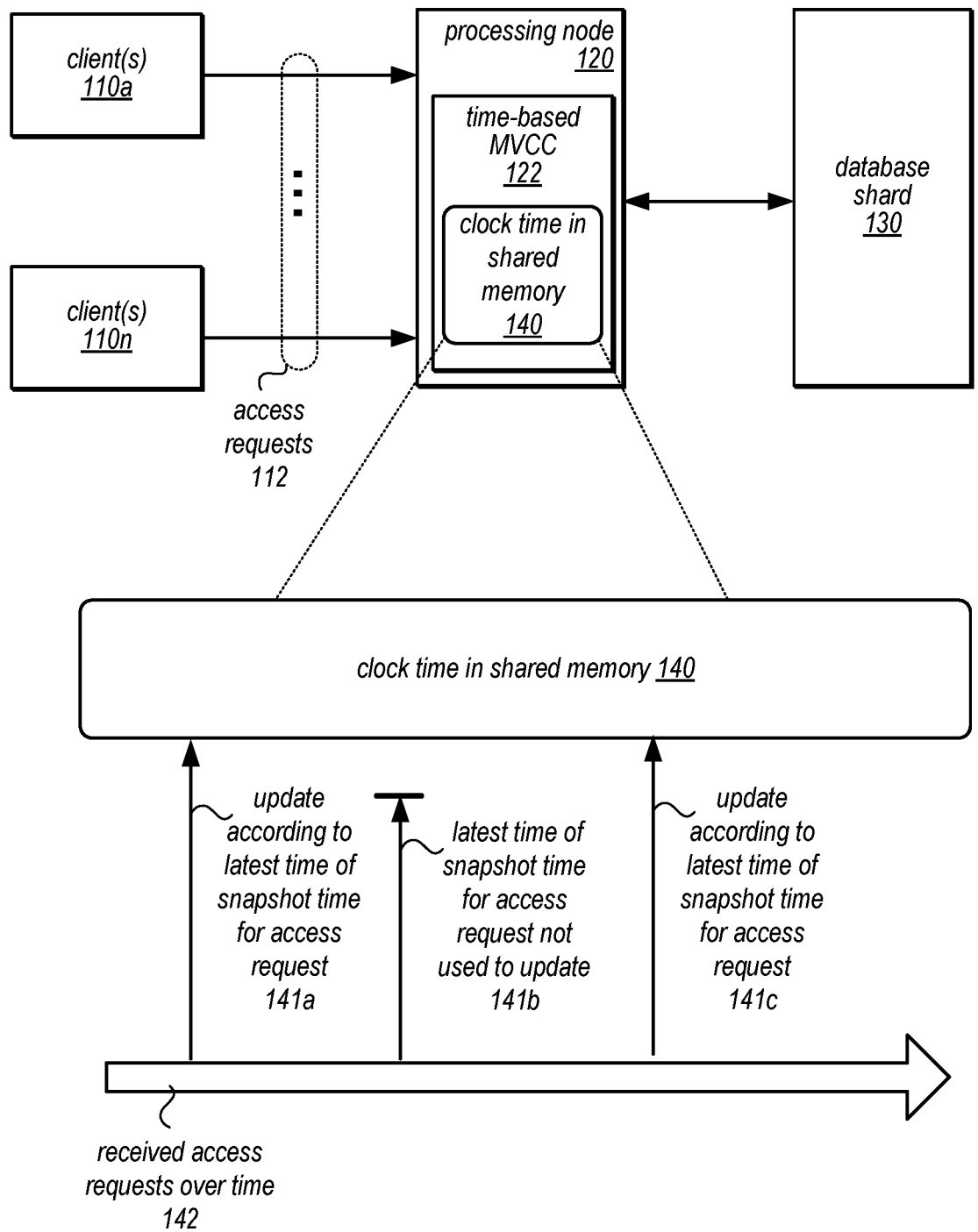
FIG. 1 is a logical block diagram illustrating increasing commit times at database shards for implementing consistency and isolation for distributed transactions, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Techniques for increasing commit times at database shards for implementing consistency and isolation for distributed transactions are described herein. Database systems consider different properties, Atomicity Consistency Isolation and Durability (ACID), for handling interactions (e.g., transactions) with database data in order to provide valid data in the face of failures, errors, and concurrent interactions. Atomicity provides a guarantee that a transaction (which can include multiple statements to perform different actions) is treated and performed as a single unit of work). Consistency is implemented to ensure that a transaction accesses a consistent state of the database. Isolation considers concurrent transactions (e.g., transactions that are received at the same or overlapping times for performance at a database), and is used to ensure that concurrent transactions are applied as if the transactions were performed serially (e.g., at different times, such as one after another). Durability provides a guarantee that once a transaction has been committed, the transaction will be preserved in the database across power failures (e.g., in non-volatile storage).

In many embodiments, different levels of ACID properties may be implemented providing different behavior characteristics for transactions. As database systems increase in size and the number of involved components, as may be the case in distributed database systems where different individual database system components have to operate together using communications to handle some actions collectively, the implementation of different levels of ACID properties grows more complex. For example, a repeatable-read isolation level (sometimes referred to as "snapshot isolation", prevents dirty reads and non-repeatable reads (sometimes referred to as a "fuzzy" read) by a transaction. A dirty read may be described as when Transaction T1 modifies x. Another transaction T2 then reads x before T1 commits or aborts. If T1 then aborts, T2 has read a data item that was never committed and so never really existed. A non-repeatable ready may be described as when Transaction T1 reads x and then T2 modifies or deletes x and commits. If T1 then attempts to reread x, it receives a modified value or discovers that the data item has been deleted.

One technique for supporting repeatable-read isolation level is through the implementation of Multi-Version Concurrency Control (MVCC). MVCC maintains different versions of data in a database and determines which version to provide to a transaction to ensure that the transaction operation achieves the desired isolation level and consistency. In this way, when database systems are handling concurrent transactions, each transaction may not interfere with another transaction (at least until a determination of whether a transaction can commit, which may handle conflicts between transactions and choose a winning transaction). MVCC can be implemented in different ways. Some implementations of MVCC utilize version identifiers, such as sequence numbers, to identify which version of data to provide. Time values are another technique for implementing MVCC.

Time-based MVCC may be implemented in various embodiments which considers and accounts for the nature of distributed systems, such as distributed database systems, which may experience clock value skew or other time discrepancies between different components of the database system. For instance, clock skew may occur where the difference in local clocks at different database system components (e.g., different servers in different physical locations, such as different data centers) can result in incorrect orderings and thus incorrect versions being provided. However, in various embodiments, techniques for implementing time-based MVCC to support repeatable-read isolation may be implemented, even when components can be highly susceptible to clock skew or other impacts on the correctness of local clocks.

For example, in various embodiments, a time synchronization system (e.g., time synchronization service 240 discussed below in FIG. 2) may be implemented that can provide information about local clock times in a distributed system. The time synchronization system may provide a range of time for which a point in time can be considered to be accurate. This range may be described as clock boundaries, "Clockbound." The use of Clockbound may be to assign a time value (e.g., timestamp) to database system actions in order to support repeatable read and other database system features. Clockbound may be represented as a range [E<i>, L<i>] where E<i> stands for earliest time, L<i> stands for latest time. These ranges may then be used for comparing different events in time. In one example, [E1, L1] may be the timestamp range returned by a local clock that is synchronized according to a time synchronization system for a first event (e.g., transaction) T1 and [E2, L2] at event T2. If T2 happened after T1, then T2>T1 (T2 definitely happened after T1) and E2>=E1. Consider another example, where [E1, L1] is the timestamp range for event T1 on host H1 and [E3, L3] at event T3 on host H2, and T3 happened after T1. This implies T3>T1 (T3 definitely happened after T1), L3>E1.

Techniques for implementing repeatable read isolation may support the implementation of other beneficial features for a distributed database system. For example, read-after-write (sometimes referred to as read-your-writes) consistency provides that, once an item has been updated, any attempt to read the item by the same client will return the updated value. This consistency makes no promises about other clients getting the updated value immediately after the write and is meant to reassure the user that their write is successful. However, this consistency level can be increased in various embodiments to provide a global read-after-write consistency so that any client would receive the updated write value through the use of the time-based techniques above for repeatable read isolation. For example, in global read-after-write after performing a write and receiving a successful response, future reads reflect the write. Future reads do not return an older version of the record (even for other clients). To do this, the time-based MVCC techniques may be implemented so that if Time (T_s)<current node's earliest time| then on next clock retrieval on any host will have latest time greater than Time (T_s).

In various embodiments, a shared memory (e.g., a memory, either volatile or non-volatile) which may be accessible to multiple operations executing on a node to perform database system tasks (e.g., processes or threads performing operations to handle transactions) of node of a distributed database system, may be implemented to store the clock time used for handling different requests, as discussed in detail below with regard to FIG. 1. By making the clock time shared, time-based MVCC that supports repeatable-read isolation and global read-after-write consistency can be implemented. Supporting increased consistency (e.g., global read-after-write) and isolation (e.g., repeatable read) in a distributed database system, may improve the performance of the distributed database system in order to accurately handle and provide data access to a large number of clients which may depend upon the scale of the distributed nature of the database system to handle the amount of data and workload (e.g., number of transactions) to the database. Accordingly it should be apparent that techniques for increasing commit times at database shards for implementing consistency and isolation for distributed transactions improve the performance of database systems and of client applications that utilize the more performant database systems.

FIG. 1 is a logical block diagram illustrating increasing commit times at database shards for implementing consistency and isolation for distributed transactions, according to some embodiments. Clients 110*a* through 110*n* may submit various access requests to a processing node 120. Clients 110*a* through 110*n* may be various types of client applications (e.g., other services or systems that utilize data stored in a database, such as database shard 130) in order to perform or support different features. Access requests 112 may be various database system queries, transactions, or other interactions with the database system submitted to processing node 120 (which may be a component of a database system which may be distributed across multiple components or may be a single component that provides access to a database). Database shard 130 may be one of many database shards (which may be accessible via other processing nodes) or may be the entirety of database data (e.g., a single shard for the database).

Processing node 120 may implement time-based MVCC 122 which may use a clock time in shared memory to determine visibility of data from database shard 130 for access requests 112, as discussed in detail below with regard to FIGS. 8-13. For instance, time values for updates performed on data that committed prior to a snapshot time of a read transaction may be selected and used (sometimes referred to as made visible) to the read transaction. Clock time in shared memory 140 may be strictly increasing in time. To ensure that the clock time in shared memory 140 is increasing, snapshot times for an access request with a latest time value, L, that is later than the clock time stored in shared memory 140, may cause the clock time in shared memory 140 to be updated to the snapshot time of the access request. Consider an example of different access requests over time, such as different access requests 142. Updates 141*a* and 141*c* may have assigned times using a time synchronization system, and thus have a range or boundary of times (as discussed above) (e.g., "[E,L]"). These assigned times may be a time value such as timestamp. In some embodiments, the assigned times may be referred to as "snapshot" times as they may provide repeatable-read isolation (which is also referred to as "snapshot" isolation) at a state corresponding to the snapshot time. To ensure that the clock time in shared memory 140 is increasing, snapshot times for an access request with a latest time value, L, that is later than the clock time stored in shard memory 140, may cause the clock time in shared memory 140 to be updated to the snapshot time of the access request.

Consider the different access requests received over time, as indicated at 142. For access request 141*a*, the latest time of the time range for the snapshot time for access request 141*a* may be later than clock time in shared memory 140, so the update may be made to clock time in shared memory 140. However, for access request 141*b*, the latest time of the snapshot time may not be later than clock time 140 and thus may not cause an update to the clock in time shared memory 140. Accordingly, clock time in shared memory 140 may be only updated in those instances where the snapshot time of an access request advances the clock time (e.g., the recorded clock time does not decrease). For instance, for access request 141*c*, the update to clock time in shared memory 140 may be made as the latest time, L, of the range of time for snapshot time for access request 141*c* may be later than the clock time in shared memory 140.

Although not depicted in FIG. 1, clock time in shared memory 140 may also be used to determine commit times, which may be the times assigned when an update as part of a transaction is committed to a database (e.g., as discussed in detail below with regard to FIGS. 8-9). For example, this may support repeatable read isolation to avoid any transaction commit lower than reader snapshot time. This protocol may be applicable in-general for all message exchanges between nodes in a cluster and update the shared memory clock 140 to avoid break in repeatable read isolation (e.g., this protocol may be applicable for determining committime for both single & multi-node transactions, as discussed below). Advancing the clock time in shared memory 140 according to the techniques discussed above may affect the clock times that are determined as commit times, causing them to increase and provide the conditions to implement global read-after-write.

Snapshot times may be assigned using a local clock at processing node 140 which is synchronized using a time synchronization service, as noted above. The "local clock" should not be confused with the stored clock time in shared memory 140. The local clock reflects time at the host system of processing node and advances automatically to measure the passage of time.

Please note, FIG. 1 is provided as a logical illustration of database nodes, clients, and a database, and is not intended to be limiting as to the physical arrangement, size, or number of components, modules, or devices to implement such features.

The specification continues with a description of an example network-based database service that supports increasing commit times at database shards for implementing consistency and isolation for distributed transactions may be implemented. Included in the description of the example network-based database service are various aspects of the example network-based database service, such as a database node, router, metadata service, control plane, and a storage service. The specification then describes flowcharts of various embodiments of methods for implementing increasing commit times at database shards for implementing consistency and isolation for distributed transactions. Next, the specification describes an example system that may implement the disclosed techniques. Various examples are provided throughout the specification.

Figure 2:
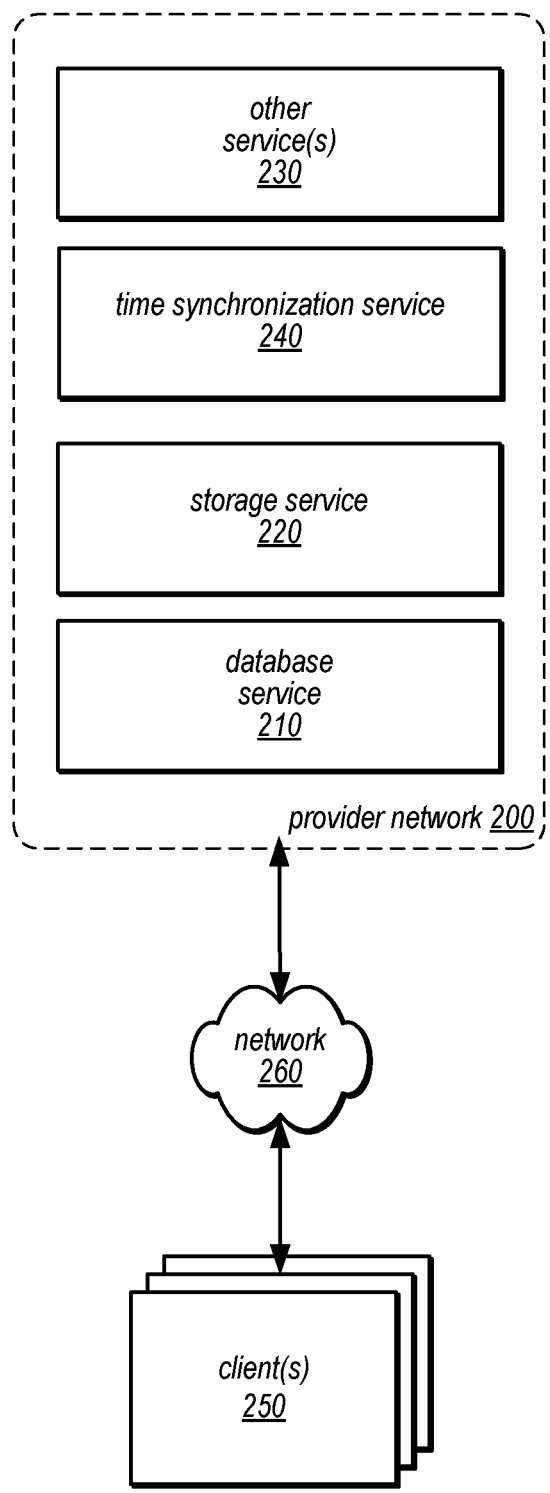
FIG. 2 is a block diagram illustrating a provider network that may implement a database service that supports both a client-managed table and system-managed table in a common database for which increasing commit times at database shards for implementing consistency and isolation for distributed transactions, according to some embodiments.

FIG. 2 is a block diagram illustrating a provider network that may implement a database service that supports both a client-managed table and system-managed table in a common database for which lease-based consistency management for handling failover may be implemented, according to some embodiments. A provider network, such as provider network 200, may be a private or closed system or may be set up by an entity such as a company or a public sector organization to provide one or more services (such as various types of cloud-based storage) accessible via the Internet and/or other networks to clients 250, in some embodiments. The provider network 200 may be implemented in a single location or may include numerous provider network regions that may include one or more data centers hosting various resource pools, such as collections of physical and/or virtualized computer servers, storage devices, networking equipment and the like (e.g., computing system 3000 described below with regard to FIG. 14), needed to implement and distribute the infrastructure and storage services offered by the provider network within the provider network regions.

For example, provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In the illustrated embodiment, a number of clients (shown as clients 250 may interact with a provider network 200 via a network 260. Provider network 200 may implement respective instantiations of the same (or different) services, a database services 210, proxy service 240, a storage service 220 and/or one or more other virtual computing service 230 across multiple provider network regions, in some embodiments. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 14 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to provider network region 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within provider network 200 (e.g., a client application of database service 210 implemented on one of other virtual computing service(s) 230), in some embodiments. Therefore, various examples of the interactions discussed with regard to clients 250 may be implemented for internal clients as well, in some embodiments.

In some embodiments, a client 250 (e.g., a database service client) may be may provide access to network-based storage of database tables to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network 200 may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Generally speaking, provider network 200 may implement one or more service endpoints may receive and process network-based services requests, such as requests to access a database (e.g., queries, inserts, updates, etc.) and/or manage a database (e.g., create a database, configure a database, etc.). For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements database service 210, time synchronization service 240, storage service 220 and/or another service(s) 230 for processing. In other embodiments, provider network 200 may be configured as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

In addition to functioning as an addressable endpoint for clients' network-based services requests, in some embodiments, provider network 200 may implement various client management features. For example, provider network 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of storage service system operational metrics, such as metrics reflecting the rates and types of requests received from clients 250, bandwidth utilized by such requests, system processing latency for such requests, system component utilization, such as the target capacity determined for individual database engine head node instances, network bandwidth and/or storage utilization, rates and types of errors resulting from requests, characteristics of stored and databases (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another service 230 (or the underlying systems that implement those services).

In some embodiments, provider network 200 may also implement user authentication and access control procedures. For example, for a given network-based services request to access a particular database table, provider network 200 ascertain whether the client 250 associated with the request is authorized to access the particular database table. Provider network 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, provider network 200 may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, services, like database service 210 or storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network region to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region may be unnecessary for internal clients such as administrative clients or between service components within the same enterprise.

Note that in various embodiments, different storage policies may be implemented by database service 210 and/or storage service 220. Examples of such storage policies may include a durability policy (e.g., a policy indicating the number of instances of a database table (or data page thereof, such as a quorum-based policy) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Figure 3:
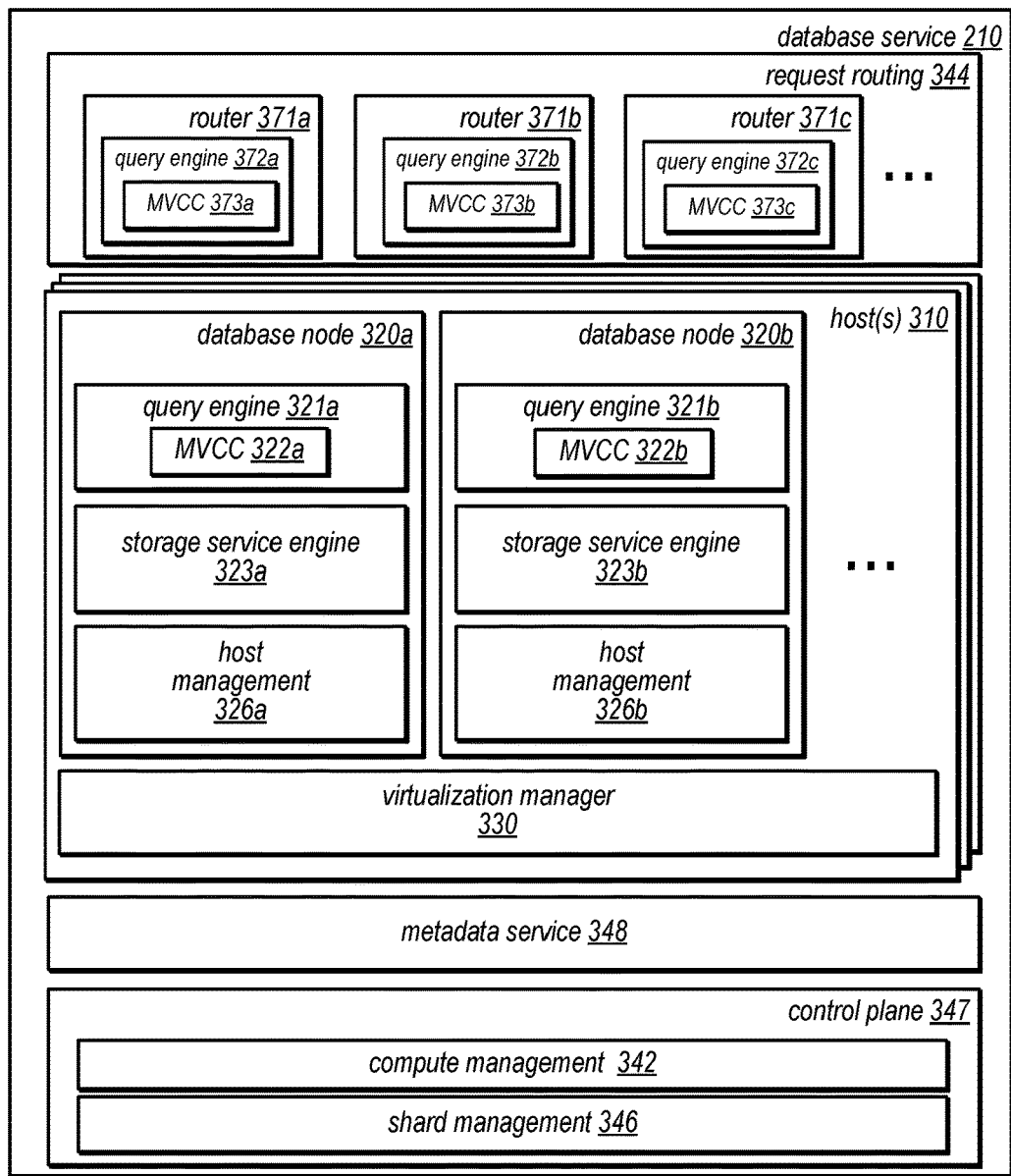
FIG. 3 is a block diagram illustrating various components of a database service and storage service that supports both a client-managed table and system-managed table in a common database, according to some embodiments.
Figure 3:
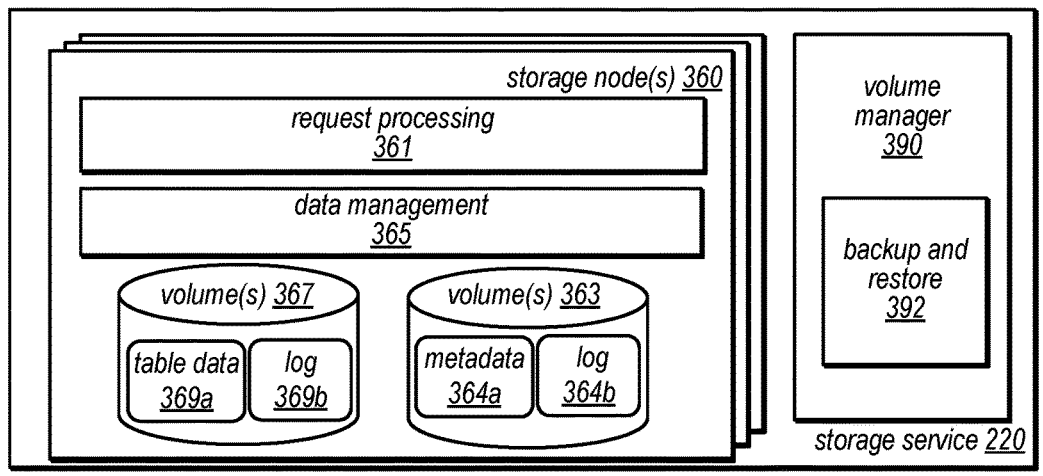

FIG. 3 is a block diagram illustrating various components of a database service and storage service that supports both a client-managed table and system-managed table in a common database, according to some embodiments. Database service 210 may implement control plane 347 which may manage the creation, provisioning, deletion, or other features of managing a database hosted in database service

210. For example, control plane 347 may monitor the performance of host(s) 310 (e.g., a computing system or device like computing system 3000 discussed below with regard to FIG. 14) via compute management 342 and shard management 346 (e.g., via heat management 341) for high workloads (e.g., heat) and move or shard assignments away from some hosts to avoid overburdening host(s) 310. Control plane 347 may handle various management requests, such as request to create databases, manage databases (e.g., by configuring or modifying performance, such as by enabling a "limitless table feature" or other automated management feature in response to a request which may cause in-place resource scaling to be enabled for that system-managed table. Control plane 347 may implement shard management 346 for system-managed tables to handle heat management 341, health monitoring 343 and placement management 345, as well as overall compute management 342 (e.g., also for client-managed tables).

Database service 210 may implement one or more different types of database systems with respective types of query engines for accessing database data as part of the database. In at least some embodiments, database service 210 may be a relational database service that hosts relational databases on behalf of clients. For example, database service 210 may implement various types of connection-based (e.g., having established a network connection between a database client and a router for an endpoint of a database which may route requests to various database nodes which may, for instance, facilitate the performance of various operations that continue over multiple communications between the database client and a connected router of a pool of routers 371*a*, 371*b*, 371*c*, and so on, of request routing 344 (or directly to a database node in some scenarios as discussed below with regard to FIG. 5).

In some embodiments, pool of routers 371 may be assigned to a particular database, such that the combination of routers 371 and database nodes 320 may be considered a cluster. For example, when a client opens a client connection, the DNS (or NLB) will re-direct the physical socket connection to one of the routers 371. Since the routers 371 serve as the front end for all traffic, they may be implemented to be highly available. The routers may be similar to (e.g., run same engine binaries) to database nodes 310 and may, in some embodiments, host database tables (not illustrated). Each router 371 may be attached to one or more data stores to store metadata (and in some embodiments table data) and temporary tables or other temporary data that may need to be persisted locally. In some embodiments, a router 371 may be designated a router leader (e.g., one of a group of routers). The router leader will be the primary owner of system-managed table metadata. The router leader may also serve as the coordinator when necessary for operations that might require serialization. In some embodiments, routers 371 may be distributed across fault tolerance or other availability zones and may perform router failover (or router addition) in order to maintain high availability for a database to which the pool of routers are assigned.

Figure 5:
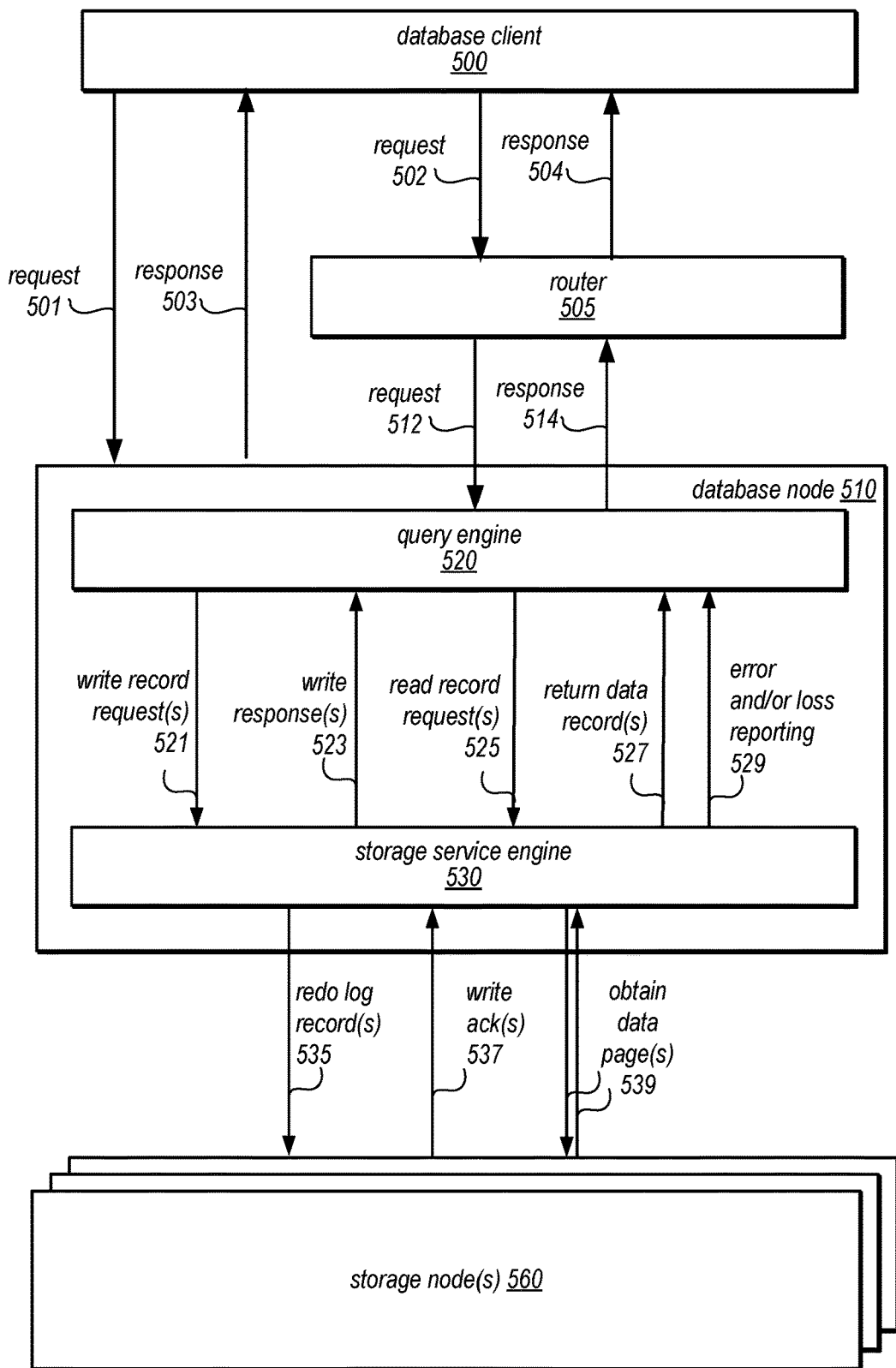
FIG. 5 is a block diagram illustrating various interactions to handle database client requests, according to some embodiments.
Figure 7:
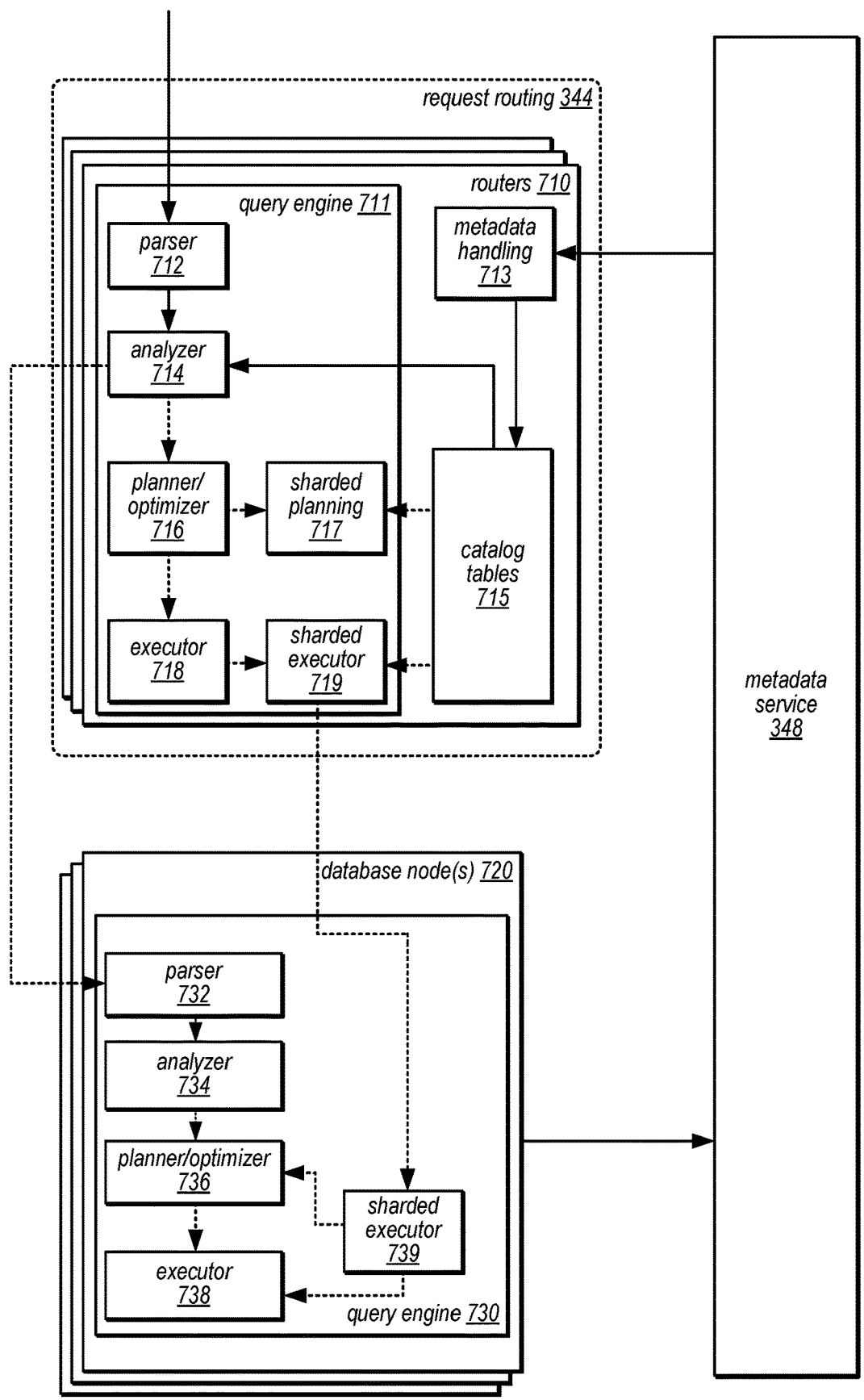
FIG. 7 is a logical block diagram illustrating a router that performs intelligent query routing across client-managed and system-managed tables, according to some embodiments.

In some embodiments, routers 371 may implement respective connection managers (not illustrated). As router nodes may mostly pull the data from database nodes for shards of a system-managed table (though not always as illustrated in some of the example distributed transaction techniques discussed below), in some embodiments, there may be a DB connection pool from every router 371 to every database node (e.g., a database). However, reusing connections from one query engine (at a router as depicted in FIG. 7) to another (e.g., to a query engine implemented on a database node, also depicted in FIG. 7) cannot usually be done between users. In such scenarios, the connection manager may be responsible for cleaning up a database connection (with a client application as depicted in FIG. 5) after database session is closed (e.g., performing operations to clear data such as session configuration, user/role info, etc.) and starting processes, instances, or other components (e.g., pgBouncer instances for Postgres databases) for cases when new database nodes 320 and routers 371 nodes are added to a database with system-managed tables for a user as part of scale-out of database nodes or routers or recovery/replacement of existing database nodes or routers. When a new client application database connection to a router 371 needs to contact other nodes (e.g., router or a database node) it does so through foreign data wrapper (FDW) managed foreign server, which may be modified to contact a local connection manager for getting an available database connection at which moment the session context may be set based on an original database connection to a router. This may include session configuration (e.g., selective) and user/role info. With that, request routing 344 may ensure that access to remote objects respects privileges and as database nodes are computation nodes as well configuration is set (as it may not be common for FDW established connections which set just a user based on user mapping configured for a foreign server).

In some embodiments, routers 371 may perform database transactions, including coordinating performance of database transactions, as discussed in detail below with regard to FIGS. 7-9. For example, routers may implement respective query engines 372*a*, 372*b*, and 372*c*, which may also implement MVCC 373*a*, 373*b*, and 373*c* in order to implement time-based MVCC to support increased consistency and isolation as discussed above with regard to FIG. 1 and below with regard to FIGS. 8-13.

Database service 210 may implement a fleet of host(s) 310 which may provide, in various embodiments, a multi-tenant configuration so that different database nodes, such as database node 320*a* and 320*b*, can be hosted on the same host 310, but provide access to different databases on behalf of different clients over different connections. While hosts(s) 310 may be multi-tenant, each database node 320 may be provisioned on host(s) 310 in order to implement in-place scaling (e.g., by overprovisioning resources initially and then scaling-based on workload to right-size the capacity that it is recorded as utilized for an account that owns or is associated with the database that is accessed by the database engine head node 320).

In various embodiments, host(s) 310 may implement a virtualization technology, such as virtual machine based virtualization, wherein database engine head node instances 320 may be different respective virtual machines, micro virtual machines (microVMs) which may offer a reduced or light-weight virtual machine implementation that retains use of individual kernels within a microVM, or containers which offer virtualization of an operating system using a shared kernel. Host(s) 310 may implement virtualization manager 330, which may support hosting one or multiple separate database engine head node instances 320 as different respective VMs, microVMs, or containers. Virtualization manager 330 may support increasing or decreasing resources made available to host(s) 310 to use for other tasks (including other database engine head node(s) 320) that were allocated to a database engine head node 320 upon creation at host(s) 310, as discussed below with regard to FIG. 9.

Database node(s) 320 may support various features for accessing a database, such as query engine(s) 321*a* and 321b, including MVCCs 322a and 322b using time as discussed above with regard to FIG. 1 and below with regard to FIGS. 8-13, and storage service engine(s) 323a and 323b discussed in detail below with regard to FIGS. 5-7. Database nodes 320 may implement agents, interfaces, or other controls according to the respective type of virtualization used to collect and facilitate communication of utilization metrics for in-place scaling, among other supported aspects of virtualization, such as host management 326a and 326b. For example, host management 326 may implement resource utilization measurement, which may capture and/or access utilization information for host(s) 310 to determine which portion of utilization can be attributed to a specific database engine head node 320.

In some embodiments, database data for a database of database service 210 may be stored in a separate storage service 220. In some embodiments, storage service 220 may be implemented as to store database data as virtual disk or other persistent storage drives. In other embodiments, embodiments, storage service 220 may store data for databases using log-structured storage. Storage service 220 may implement volume manager 390, which may implement various features including backup and restore 392.

For example, in some embodiments, data may be organized in various logical volumes, segments, and pages for storage on one or more storage nodes 360 of storage service 220. For example, in some embodiments, each database may be represented by a logical volume, such as logical volumes 367 and 363 (which may include both table data 369a and corresponding log(s) 369 (b) (e.g., redo logs). Table data 369a may be an entire table for a client-managed table or a shard of a system-managed table, as discussed in detail below. In some embodiments, volume(s) 363 may store metadata 364a for a database and a respective change log 364b. Each logical volume may be segmented over a collection of storage nodes 360. Each segment, which may live on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, storage nodes 360 of storage service 220 may perform some database system responsibilities, such as the updating of data pages for a database, and in some instances perform some query processing on data. As illustrated in FIG. 3, storage node(s) 360 may implement data page request processing 361, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), clone volume creation, log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

Figure 4:
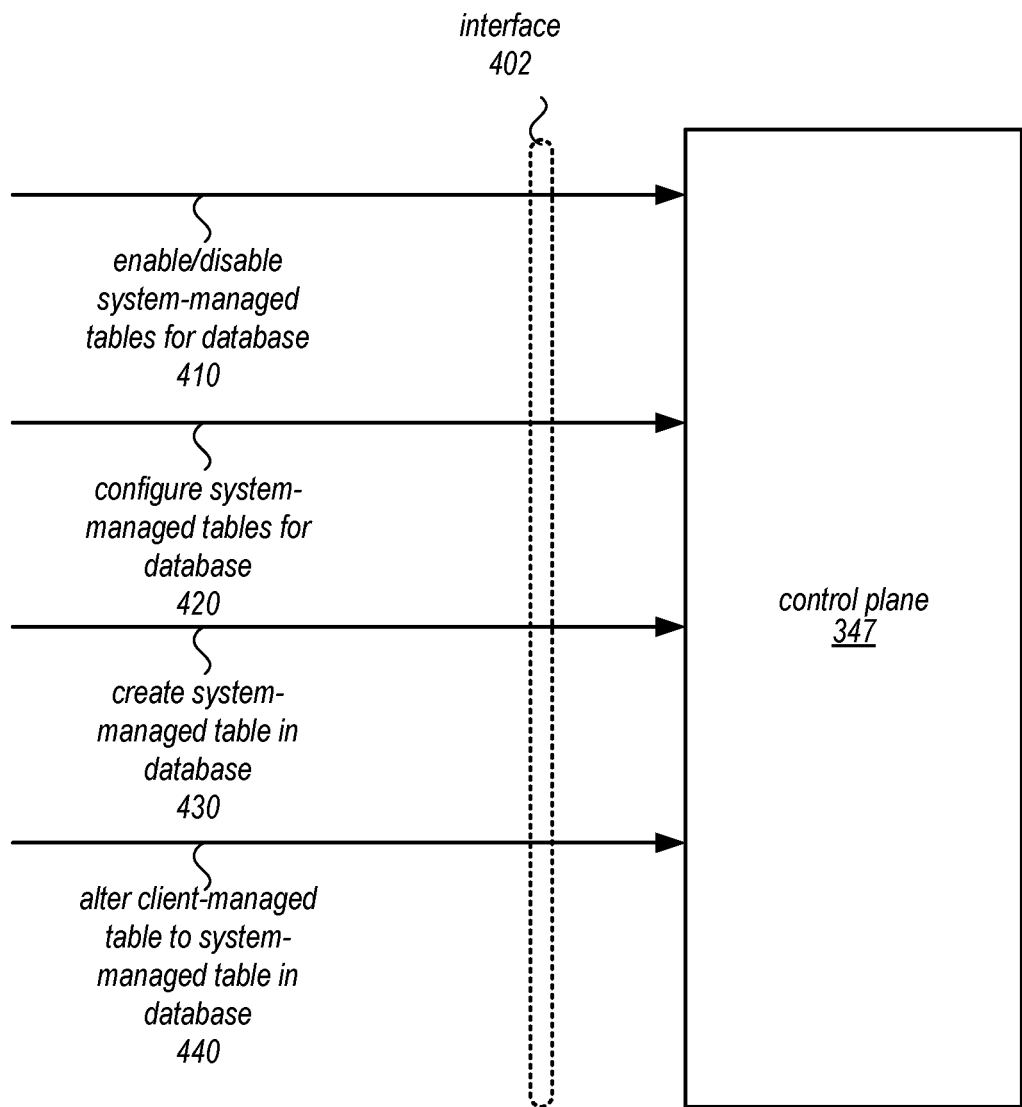
FIG. 4 is a block diagram illustrating various interactions to handle database client requests, according to some embodiments.

FIG. 4 illustrates interactions with a control plane of a database service for managing system-managed tables, according to some embodiments. Interface 402 may be a command line, programmatic (e.g., API), or graphical user interface for control plane 347. As indicated at 410, a request to enable or disable system-managed tables for a database may be received, in some embodiments. For example, the database may be identified (e.g., by identifier such as a number or resource number) along with the parameter set to enable or disable system-managed tables. In some embodiments, various system-management parameters, such as scaling limits for computing resources, including cost-based, resource-based, or other limitations, for instance as minimum and or maximum boundaries for scaling (or scaling within a period of time). As indicated at 420, these system-managed table parameters can be separately configured to add, remove, or change the parameters. In some embodiments, enabling system-managed tables may include parameters to configure the availability of the table across one (or more) availability zones. In some embodiments, time-based MVCC as discussed above with regard to FIG. 1 and below with regard to FIGS. 8-13, can be enabled or disabled as part of requests 410 or 420 as a parameter.

Enabling system-managed tables may cause the creation of (or transfer of) a network endpoint (e.g., a network address) that is specific to the database to route requests to request routing 344 (which may assign or distribute the request to connect the database to different ones of routers 371 according to a load balancing scheme). In this way, connection requests to access the database (whether for a system-managed table or client-managed table) may be routed through request router 344 (e.g., instead of being routed directly to an existing database node already assigned to a current client-managed table of the database). These system-managed table parameters may be stored or updated in an administrative database and/or database metadata that is used to control database service 210 management of the database using various control plane features.

In some embodiments, control plane 347 may receive request to create a system-managed table in a database, as indicated at 430 or alter a client-managed table to a system managed table in the database, as indicated at 440. In some embodiments, these requests may be received at the database node for the database directly or at a router and thus may be received through the "data plane." These requests, however may then be forwarded or dispatched to control plane 347 to direct the operations to complete the requests.

Control plane 347 may perform the various operations to create or alter tables to system-managed tables. For example, aligned tables may be identified and stored across different shards, according to an initial placement hierarchy that may be determined for the system-managed table(s) (e.g., a default or standard hierarchy may be initially used and then modified overtime according various heat or operations). Various migration techniques may be used to move the existing table data to the appropriate shard or store, when received, new data into a table (e.g., as part of insert requests or batch updates to add table data). Control plane 347 may initialize or update metadata to identify the new (or altered) system-managed table so that routers may correctly identify and route requests to the appropriate database nodes. Control plane 347 may also provision or assign database nodes to shards of the system-managed table.

FIG. 5 is a block diagram illustrating various interactions to handle database client requests, according to some embodiments. In the example database system implemented as part of database service 210, a database engine head node 510 may be implemented for each database and storage nodes 560 (which may or may not be visible to the clients of the database system and may be similar to storage nodes 360 discussed above with regard to FIG. 3). Clients of a database may access a database node 510 directly in some embodiments (as indicated at request and response 503 instead of through router 510, such as requests that are directed to client-managed tables) via network utilizing various database access protocols (e.g., Java Database Connectivity (JDBC) or Open Database Connectivity (ODBC)). However, storage nodes 560, which may be employed by the database service 210 to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, storage nodes 560 may perform various storage, access, change logging, recovery, log record manipulation, and/or space management operations in a manner that is invisible to clients of a database node 510.

As previously noted, a database node 510 may implement query engine 520 and storage service engine 530, in some embodiments. Query engine 520 may receive requests, like request 512, which may include queries or other requests such as updates, deletions, etc., from a router 505 connected to a database client 500 which first received the request 502 from the database client 500. Implementing a router 505 between database client 500 and database node 510 may allow for database service 210 implement both client-managed tables and system-managed tables in the same database, as discussed in detail below. Query engine 520 then parses them, optimizes them, and develops a plan to carry out the associated database operation(s), as discussed in detail below with regard to FIG. 7.

Query engine 520 may return a response 514 to the request (e.g., results to a query) which router 505 may provide as response 504 to database client 500, which may include write acknowledgements, requested data (e.g., records or other results of a query), error messages, and or other responses, as appropriate. As illustrated in this example, database node 510 may also include a storage service engine 530 (or client-side driver), which may route read requests and/or redo log records to various storage nodes 560 within storage service 220, receive write acknowledgements from storage nodes 560, receive requested data pages from storage nodes 560, and/or return data pages, error messages, or other responses to query engine 520 (which may, in turn, return them to a database client).

In this example, query engine 520 or another database system management component implemented at database engine head node 510 (not illustrated) may manage a data page cache, in which data pages that were recently accessed may be temporarily held. Query engine 520 may be responsible for providing transactionality and consistency in the database of which database engine head node 510 is a component. For example, this component may be responsible for ensuring the Atomicity, Consistency, and Isolation properties of the database and the transactions that are directed that the database, as discussed in detail below with regard to FIGS. 8-11, such as determining a MVCC snapshot time of the database applicable for a query, applying undo log records to generate prior versions of tuples of a database. Query engine 520 may manage an undo log to track the status of various transactions and roll back any locally cached results of transactions that do not commit.

For example, a request 512 that includes a request to write to a page may be parsed and optimized to generate one or more write record requests 521, which may be sent to storage service engine 530 for subsequent routing to storage service nodes 560. In this example, storage service engine 530 may generate one or more redo log records 535 corresponding to each write record request 521, and may send them to specific ones of the storage nodes 560 of storage service 220. Storage nodes 560 may return a corresponding write acknowledgement 537 for each redo log record 535 (or batch of redo log records) to database node 510 (specifically to storage service engine 530). Storage service engine 530 may pass these write acknowledgements to query engine 520 (as write responses 523), which may then send corresponding responses (e.g., write acknowledgements) to one or more clients as a response 514.

In another example, a request that is a query may cause data pages to be read and returned to query engine 520 for evaluation. For example, a query could cause one or more read record requests 525, which may be sent to storage service engine 530 for subsequent routing to storage nodes 560. In this example, storage service engine 530 may send these requests to specific ones of the storage nodes 560, and storage nodes 560 may return the requested data pages 539 to database node 510 (specifically to storage service engine 530). Storage service engine 530 may send the returned data pages to query engine 520 as return data records 527, and query engine 520 may then evaluate the content of the data pages in order to determine or generate a result of a query sent as a response 514.

In some embodiments, various error and/or data loss messages 541 may be sent from log-structured storage service 550 to database node 510 (specifically to storage service engine 530). These messages may be passed from storage service engine 530 to query engine 520 as error and/or loss reporting messages 529, and then to one or more clients as a response 514.

In some embodiments, the APIs 535-539 to access storage nodes 560 and the APIs 521-529 of storage service engine 530 may expose the functionality of storage service 220 to database node 510 as if database node 510 were a client of storage service 220. For example, database node 510 (through storage service engine 530) may write redo log records or request data pages through these APIs to perform (or facilitate the performance of) various operations of the database system implemented by the combination of database node 510 and storage nodes 560 (e.g., storage, access, change logging, recovery, and/or space management operations).

Note that in various embodiments, the API calls and responses between database node 510 and storage nodes 560 (e.g., APIs 521-529) and/or the API calls and responses between storage service engine 530 and query engine 520 (e.g., APIs 535-539) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database node 510 and/or storage nodes 560.

Figure 6:
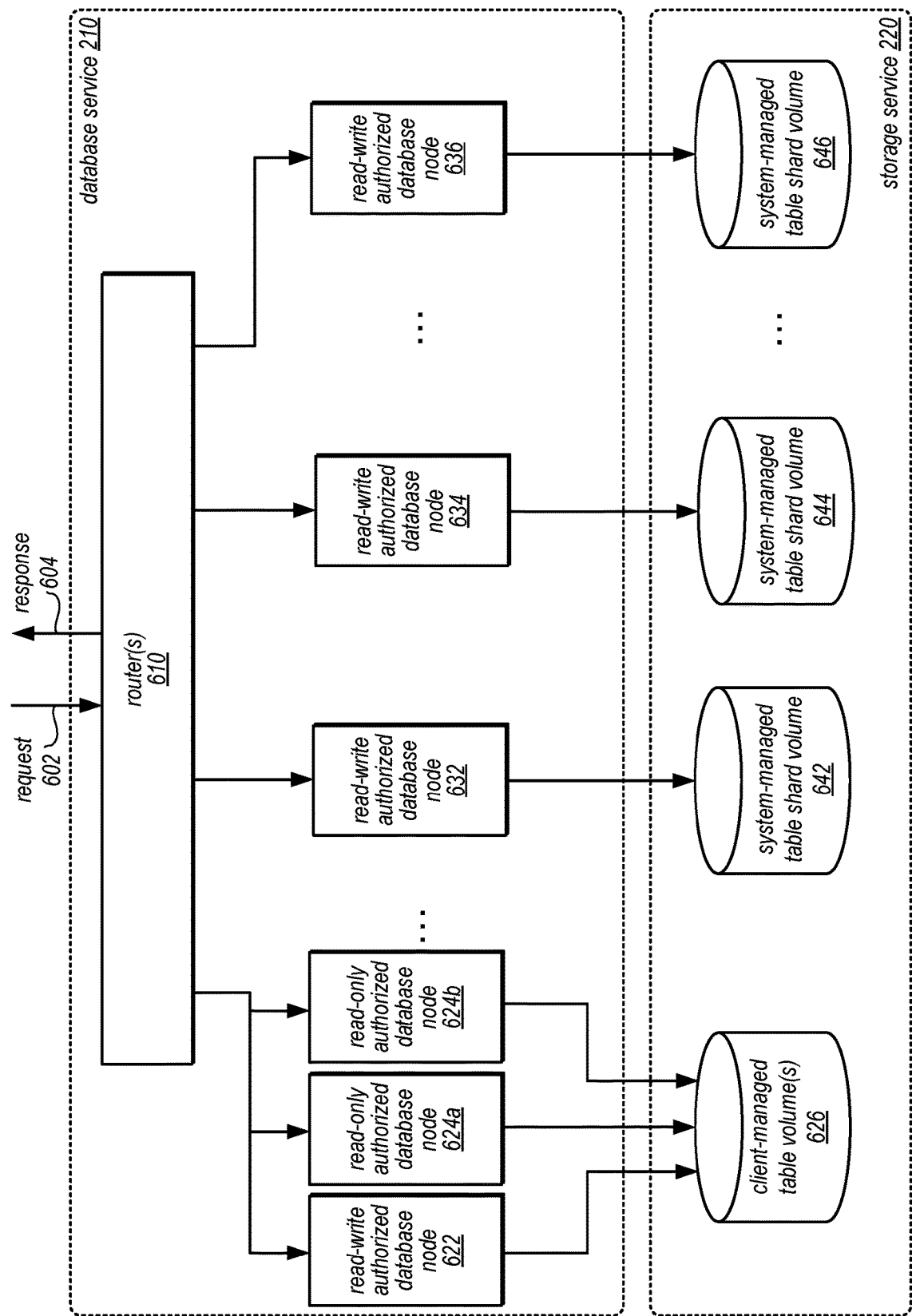
FIG. 6 is a logical block diagram illustrating interactions for a database that includes both a client-managed table and a system-managed table.

FIG. 6 is a logical block diagram illustrating interactions for a database that includes both a client-managed table and a system-managed table. Request 602 may be received at one of many routers 610 that are implemented as part of database service 210, as discussed above with regard to FIG. 3. A router 610 may accept the request and direct it to the appropriate database nodes using both the query planning location selection techniques and, if a transaction, commit protocol techniques, discussed below with regard to FIG. 7. A client-managed table may be stored in a client-managed table volume 626 which may be connected to assigned database nodes, such as read-write authorized database node 622. In some embodiments, read-only nodes 624a and 624b, can also be assigned to increase read capacity. As discussed above with regard to FIG. 5, database node 622 can request data pages, send redo log records, and otherwise interact with client-managed table volumes for portions of access requests targeted to client-managed tables.

For a system-managed table, multiple shards may be determined assigned to different read-write database nodes 632, 634, and 636 respectively for shards stored in volumes 642, 644, and 646. Although not illustrated, read-only nodes may also be assigned to shards in order to satisfy the workload requirements on system-managed tables. The number of assigned database nodes and shards for a system-managed table may change over time as additional compute or storage capacity is needed. These changes may be determined automatically by database service 210 (e.g., via heat management 342).

FIG. 7 is a logical block diagram illustrating a router that performs intelligent query routing across client-managed and system-managed tables, according to some embodiments. Routers 710 may implement a query engine 711. When an access request is received, query engine 711 may parse the request at parser 712 and analyze the request at analyzer 714 to determine which shards or client-managed tables should be accessed to perform the access request according to catalog tables 715, which may be synchronized using metadata service 348 to obtain up-to-date shard, database node, and other assignments for tables in the database. Then, according to the analysis 714 different planning location(s) and execution paths (illustrated by the dotted line paths) may result. For example, network I/O minimization may be used to select between different distributed execution plans for access requests, in some embodiments.

For example, for router-selected planning, planner/optimizer 716 may generate a query plan and pass the plan off to sharded planning 717, which may add features to aggregate results from multiple database nodes at shards (and also a client-managed table if included in a request with one or more shards). The sharded plan may then be passed to executor 718 which may provide instructions to sharded executor 719 to perform at database node(s) 720. Database nodes 720 may perform different requests according to different execution paths (e.g., receiving subsets of plans for further planning/optimization 736 and then execution through sharded executor 739, or straight to executor 738 via sharded executor 739). Alternatively, when a database node is involved in performing a request (e.g., at only one database node), then the request may be sent for parsing 732, analysis 734, planning/optimization 736, and optimization 738. Although not depicted results may be returned from the database node(s) 720 to router 710 to return to a client (as depicted in FIG. 5).

Updates that are caused to metadata (e.g., changes to database schemas by DDL requests or modifications to client-managed tables that are replicated), may be reported through metadata service 348.

MVCC may be implemented at both request routers and database nodes in order to support global read-after-write and repeatable read isolation using increasing time values. For example, when selecting which page versions to read (or from multiple versions obtained), a snapshot time may be utilized. The following discussion provides various examples of request handling which may utilize the clock in shared memory to support global read-after-write and repeatable read isolation.

Figure 8:
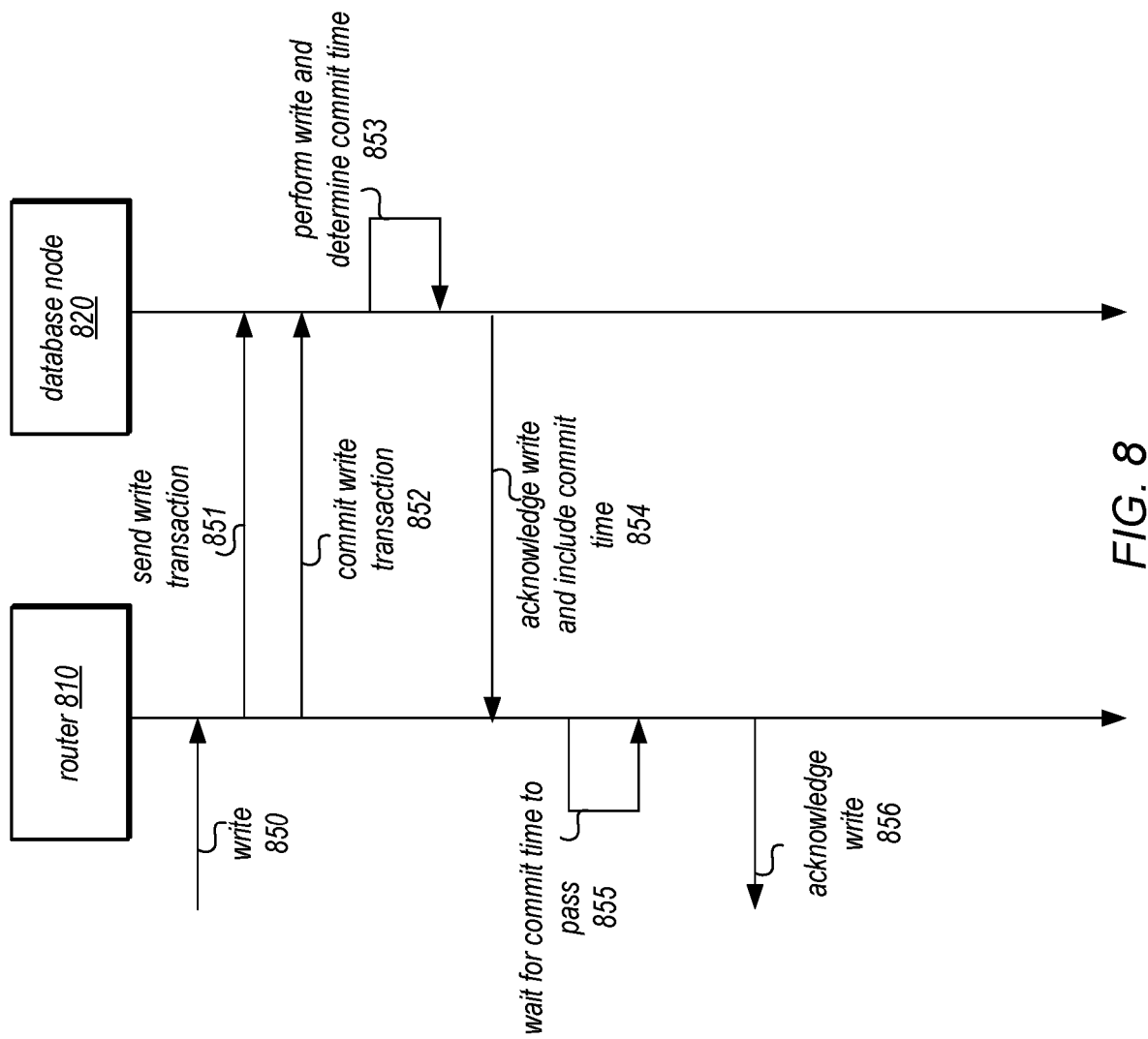
FIG. 8 is a sequence diagram for a single shard write transaction, according to some embodiments.
Figure 9:
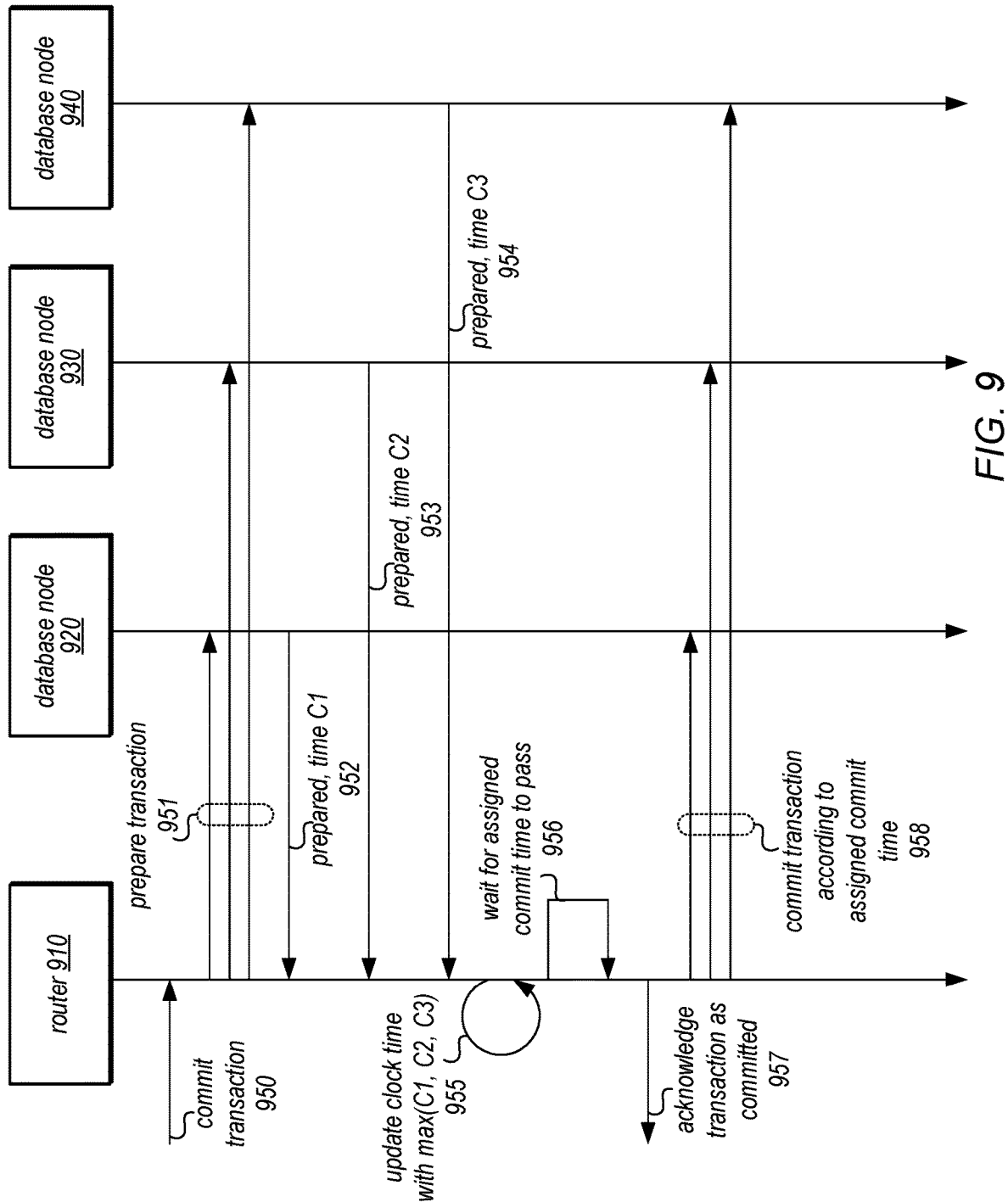
FIG. 9 illustrates a sequence diagram for a multi-shard distributed transaction that provides global read after write consistency, according to some embodiments.

FIG. 8 is a sequence diagram for a single shard write transaction, according to some embodiments. As indicated at 810, a write transaction 850 (e.g., a write statement to insert, modify, delete records in a database table) may be received at router 810 for a table associated with router 810. Router 810 may determine that the write only interacts with one shard of the database, and thus may send the write transaction, as indicated at 851, to the responsible database node 820 for that database shard.

Once database node 820 completes the write, it goes through the commit protocol, in some embodiments. For example, database node 820 may determine the commit-time, as indicated at 853 using a clock stored in a shared memory of database node 820 (which is advanced according to techniques discussed above with regard to FIG. 1), assigning as the commit time the stored time in the shared clock (which may have been updated by the write if the snapshot time of the write was later than the stored time as discussed above in FIG. 1. The transaction may then be stored in persistently (e.g., in write performed to one or more storage nodes as illustrated above in FIG. 5 by database node 820 (not illustrated)). As indicated at 854, the transaction may be acknowledged and the commit time included. As indicated at 855, if the commit time is in the "future" compared to the stored shared clock time at router 810, then router 810 may wait until commit time is passed (e.g., router 810's stored clock time has increased to greater than the commit time) and then acknowledge the write, as indicated 856. By performing the wait, this technique ensures that any next read can read the last write (as it's snapshot time may be assigned to be later than that of the write. This technique also moves the wait from database node 820 to router 810, which provides better performance than if database node 820 would have waited and returned to router.

Some transactions interact with multiple database shards. FIG. 9 illustrates a sequence diagram for a multi-shard distributed transaction that provides global read after write consistency, according to some embodiments. Router 910 may be associated with a database that has multiple database shares, each of which is accessed using respective database nodes 920, 930, and 940. A request to commit a transaction that includes multiple writes at each of the nodes may be received, as indicated at 950. For example, router 910 may perform 2-phase-commit protocol. Router 910 may send a requests to prepare the transaction, as indicated at 951. When router receives successful prepare from all participants along with their individual commit times (determined as discussed above with regard to FIGS. 1 and 8) as indicated at 952, 953, and 954, then router 910 takes the max of all time received from all participants and update the clock in shared memory at router 910, as indicated at 955. By updating the clock on 910, this ensures that the next clock read will be higher than prepared time from all shards. Router 910 while committing the transaction, gets the clock from shared clock time and assign the commit-time to the transaction at router 910, and waits for this commit-time to pass, as indicated at 956, returns an acknowledgment of the transaction as committed, as indicated at 957. Then, as indicated at 958, router 910 may send commit transaction signals according to the assigned commit time. By advancing and using the stored clock in shared memory in this ways, for the next access request, the stored clock is guaranteed to be >committed transaction commit-time. This is guaranteed on any node in the associated nodes with the database. So, if another access request (e.g., a query) where to be performed by a different router, the query will still have read after write consistency when reading from one of database nodes 920, 930, or 940.

There are some scenarios that can occur when router 910 sends commit signal 958 that can be lost or delayed. Visibility techniques for time-based MVCC as discussed in detail below with regard to FIG. 11 may be implemented by allowing for the state of a transaction to influence whether or not a version of the data (e.g., the version of the data where the transaction prepared but did not receive the commit signal) is made visible. For example, a read may see tuple which will be in a prepared state. To do this, a database node's MVCC may need to make sure that prepared tuple is visible or not, as the prepared transaction might be committed, aborted or still in-progress. In such scenarios, database nodes can check with router 910 to obtain the transaction state and accordingly perform the MVCC visibility rule.

Figure 10:
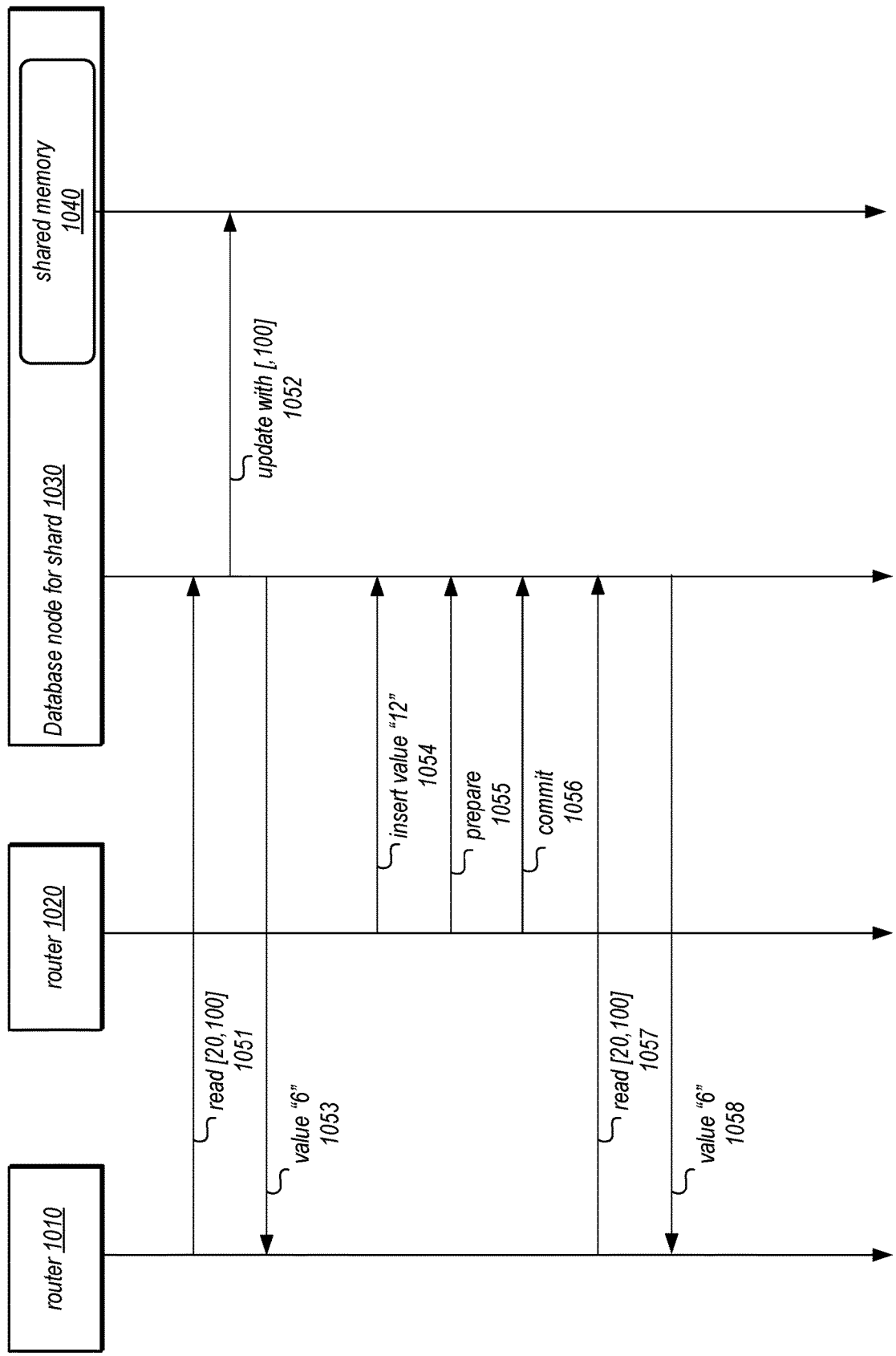
FIG. 10 is a sequence diagram illustrating providing repeatable read isolation for multiple request routers accessing a shard of a database, in some embodiments.

FIG. 10 is a sequence diagram illustrating providing repeatable read isolation for multiple request routers accessing a shard of a database, in some embodiments. Router 1010 may perform a first transaction. Router 1020 may perform a second transaction. Database node for shard 1030 may utilize shared memory 1040 to determine which version of tuple to provide for each transaction. By implementing the techniques discussed above, a read with startTime [E,L] can be guaranteed to be sent to a database node for a shard then any new commit time will always be greater than L. By doing this read-after-write and repeatable read are guaranteed, returning one version of the request data.

For example, transaction 1 from router 1010 will send a read request with snapshot time (e.g., range [20, 100]) to database node 1030 for a shard. In this example, the stored time in shared memory 1040 may be updated using this request's latest time. A value of "6" will be returned, as indicated at 1053. So shared memory is updated to 100, as indicated at 1052. Then when a different router, router 1020, sends another transaction, as indicated at 1054, to insert value 12 into the same data, its commit time returned will be 100 by getting it from shared memory 1040 when prepare 1055 and commit 1056. When router 1010 sends read request 1057, with the same snapshot time [20,100], because commit time of value 12 is 100, this will render the value of "12" invisible to read 1057 at database node 1030 (e.g., according to a visibility rule that does not make visible data with commits greater than or equal to the commit times of. Instead, request will return value 6 same as its first request.

Figure 11:
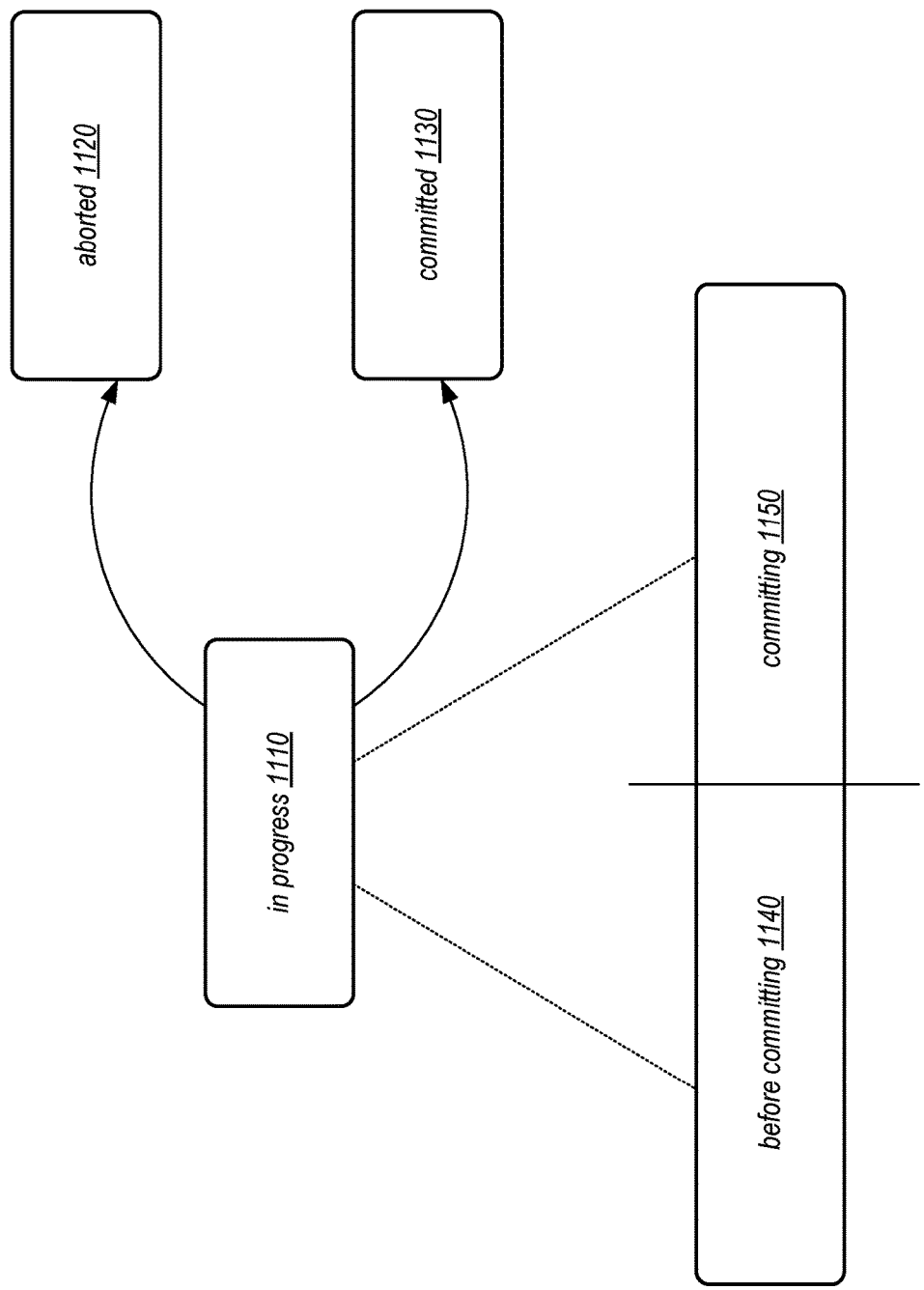
FIG. 11 is a logical block diagram illustrating different transaction states used to implement multi-version concurrency control according to time, in some embodiments.

FIG. 11 is a logical block diagram illustrating different transaction states used to implement multi-version concurrency control according to time, in some embodiments. In various embodiments, different transaction states may be used to implement multi-version concurrency control according using time. For example, an in progress 1110 transaction state may transition to either aborted state 1120 or committed state 1130. As part of in progress state 1110, different sub states, before committing 1140 and committing 1150, may be implemented in some embodiments to reduce latency when determining whether a tuple can be visible.

The following discussion describes various interactions between transaction state and snapshot times for a transaction, which may be described according to the minimum and maximum values for the range of time provided by a local clock at a components of the distributed system (e.g., request router, database node) which may be synchronized using a time synchronization system, like time synchronization service 240.

For example, consider transaction T1 and read R. To decide whether data (e.g., a row, record, or data item, such as a tuple) operated on by T1 is visible to R, the following visibility evaluation may be performed. First, the transaction state of the transaction may be determined. If the T1 state is in before committing state then do below:

If T1's commit-time is less than R's snapshot time:
   T1 is still in-progress then wait for T1 to commit or abort.
   T1 is committed in clog then tuple is visible.
   T1 is aborted then tuple is not visible
   if T1's commit-time is less than R's snapshot time then tuple is not visible
   If not in committing state & not prepared then not visible
   If T1 is in prepared state then check with request router
   If T1 is not in-progress and
   if T1 committed then it can perform MVCC based on T1 commit-time
       if T1 is aborted then it is not visible.

Furthermore, in some embodiments in time based MVCC mode, getting the commit time from the clock latest time and flushing the commit log that records the commit time to the storage is not atomic. So IN_PROGRESS status may be further divided into two sub-status BEFORE_COMMITTING, COMMITTING, as discussed above. If the transaction has obtained the commit time from clock latest time but not committed yet, this transaction is in COMMITTING status. If the transaction is in progress and hasn't obtained the commit time yet, this transaction is in BEFORE_COMMITTING status.

Time based MVCC may use the commit time as a consistent time snapshot to compare with a tuple's commit time (e.g., time range of xmin/xmax) directly if the transaction has been committed in transaction status. When committing is in progress, then different handling techniques are performed to determine visibility.

If current transaction visits a tuple whose xmin transaction is in BEFORE_COMMITING status, there are two cases: (1) if current transaction is a local transaction, latest time already passes current transaction's snapshot time; when xmin gets its commit time, this time must be equal or newer than the stored clock time in shared memory, and hence newer than snapshot time. (2) if current transaction is a distributed transaction, when it arrives, it will update the stored clock time to guarantee that the latest time is no less than the distributed snapshot time. The xmin transaction will obtain the prepare time newer than the current transaction's snapshot time. Hence, the xmin transaction's commit time will be newer than the current transaction's snapshot time due to the distributed transaction protocol taking max(prepared_time from all participants) as commit time, as discussed above with regard to FIG. 9. In both cases, xmin's commit time>snapshot time. When visiting this tuple again, if xmin transaction id has been committed, by comparing the commit time, the tuple can be determined to be invisible. For the same snapshot, the visibility check is always invisible.

If current transaction visits a tuple whose xmin transaction is in COMMITTING status, its commit time could be either older or newer than current transaction's snapshot time. In order to handle this, first compare its commit time with current transaction's snapshot time, if xmin commit time>=snapshot time, return invisible since even in 2nd visit, this xid is committed, its commit time will still be same, newer than the snapshot time. However, if the xmin commit time<snapshot time, wait until this transaction has been committed to guarantee snapshot isolation.

BEFORE_COMMITING and COMMTING are status for local transactions. It's possible that xmin is a participant of at distributed transaction using two phase commit protocol. So, a check may be performed as to whether xmin is in prepared status too. If yes, an inquiry may be sent to the request router to determine the status of this distributed transaction. If it is committed, the request router (sometimes referred to as a coordinator) will return its commit time. If it is not committed yet on the request router, then its commit time must be newer than the snapshot time because the coordinator will update its stored clock latest time using the snapshot time. If the distributed transaction is in COMMITTING status, e.g., the request router's local transaction is in COMMITTING status, the transaction wait till the request router's local transaction commits if its commit time<snapshot time.

In some embodiments, individual versions of rows, records, data items, or tuples may be checked for visibility using the clock times and state of the transaction that has updated the rows, records, data items or tuples.

Example pseudo code of visibility rules, where "xmin" is the minimum range of time for the transaction snapshot time (e.g., "E") and "xmax" is the maximum range of time for the transaction snapshot time (e.g., "L"), is described below:

```
if (xmin status is BEFORE_COMMITTING) {
//xmin future commit time>snapshot time
return invisible;
}
else if (xmin status is COMMITTING) {
```

-continued

```
    if (xmin commit time < snapshot time) {
      wait until xmin is committed or aborted;
      if aborted, return invisible
        else fall to the xmin is committed branch to check xmax
    } else {
      // xmin commit time >= snapshot time
      return invisible; }
  }
  else if (xmin is PREPARED) {
    inquiry the request router to check the commit status on
      the request router, behaves as a reader to get
        distributed transaction commit time
    if committed, fall to the xmin is committed branch to
      check xmax
    else return
      // xmin commit time >= snapshot time
      invisible;
  }
  else if (xmin is COMMITTED) {
  //xmin committed, not concurrent trx
    get xmin_commit_time;
    if ( xmin_commit_time >= snapshot_time) {
      return invisible; // xmin committed after snapshot time
    } else if (xmin_commit_time < snapshot_time) {
      // xmin committed before snapshot time,
      // need to check xmax
      if ( xmax status is BEFORE_COMMITTING) {
        return visible; //xmin<snapshot time<xmax future commit
      } else if (xmax is in COMMITTING) {
        if (xmax commit time < snapshot time) {
          wait until xmax is committed or aborted;
          // xmin <= xmax < snapshot time
          if (xmax committed) return invisible;
            // xmin < snapshot time, xmax aborted
            else return visible if aborted;
        } else {
          // xmin < snapshot time <= xmax
          return visible;
          }
    } else if (xmax is PREPARED) {
      inquiry the request router to check the commit status
      if xmax committed
        fall on xmax committed branch to compare commit time
      else
        // xmin < snapshot time <= xmax
        return visible;
    } else if (xmax is COMMITTED) {
      // xmax commited, not concurrent trx
      get xmax_commit_time;
      if (xmax_commit_time >= snapshot_time) {
        // xmin < snapshot time <= xmax
        return visible;
      }else if (xmax_commit_time < snapshot_time) {
        // xmin <= xmax < snapshot time
        return invisible;
        }
      }
    }
  }
}
```

The database service and storage service discussed in FIGS. 2 through 11 provide examples of a database system that may implement increasing commit times at database shards for implementing consistency and isolation for distributed transactions. However, various other types of data processing systems may implement multiple data processing nodes and thus make use of lease-based consistency management for handling failover in a data set.

Figure 12:
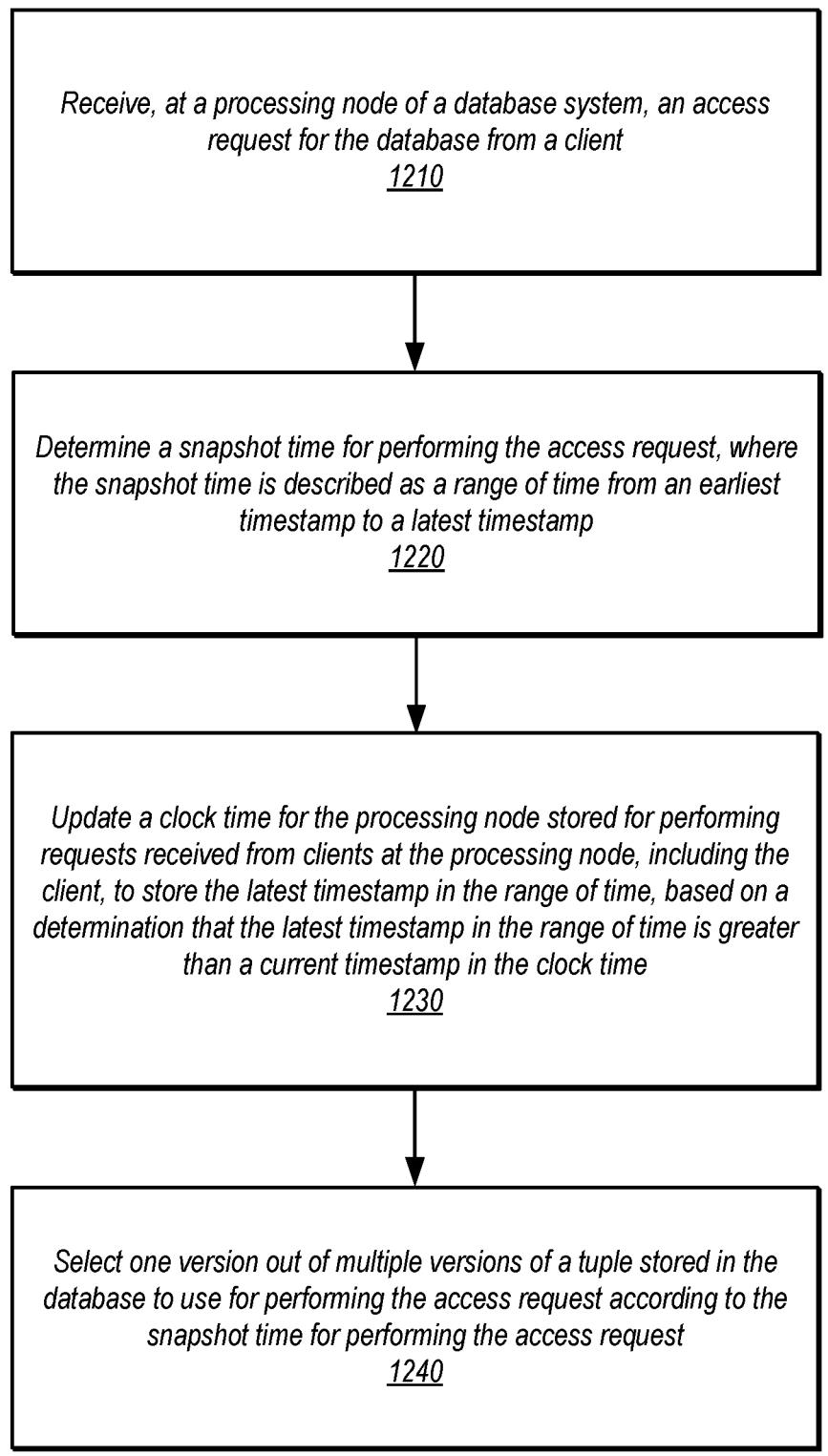
FIG. 12 is a high-level flowchart illustrating various methods and techniques to implement increasing commit times at database shards for implementing consistency and isolation for distributed transactions, according to some embodiments.

FIG. 12 is a high-level flowchart illustrating various methods and techniques to implement increasing commit times at database shards for implementing consistency and isolation for distributed transactions, according to some embodiments. Various different systems and devices may implement the various methods and techniques described below, either singly or working together. For example, a database service and storage service as discussed above may implement the various methods. Alternatively, a combination of different systems and devices may implement the various techniques. Therefore, the above examples and or any other systems or devices referenced as performing the illustrated method, are not intended to be limiting as to other different components, modules, systems, or configurations of systems and devices.

As indicated at 1210, a processing node of a database system assigned to a shard of a database table may receive an access request for a database table from a client, in some embodiments. The access request may be a read or write. The access request may be part of a transaction (e.g., one statement of multiple statements to perform reads or writes on a database table). In some embodiments, the database table may be a system-managed database table as discussed above with regard to FIGS. 2-7, or may be a database table for which sharding is manually managed, in some embodiments. In some embodiments, the database system may have a single shard or multiple shards and thus may be a distributed database system.

As indicated at 1220, a snapshot time for performing the access request may be determined, where the snapshot time is described as a range of time from an earliest timestamp to a latest timestamp, in some embodiments. For example, as discussed above, a snapshot time may be determined using a local clock at the processing node that obtains time according to a time synchronization service that gives a range of time (e.g., "[E,L]"). These times may be represented as timestamps or other time values. In some embodiments, the snapshot time may be determined by another component different than the processing node. For example, the snapshot time may be determined by a request router or other coordinator that sent the access request to processing node (which may be acting as a database node similar to database nodes discussed above with regard to FIGS. 3-9).

As indicated at 1230, a clock time for the processing node stored for performing requests received from clients at the processing node, including the client, may be updated to store the latest timestamp in the range of time, based on a determination that the latest timestamp in the range of time is greater than a current timestamp in the clock time, in some embodiments. In some embodiments, the clock time may, unlike the snapshot time, be a single timestamp and not a range. However, in other embodiments, a range of time may be used to represent the clock time. For example, the clock time may be a time value that is used to determine visibility under MVCC and update or assign times for commit, prepare, or various other protocols, as discussed above with regard to FIGS. 8-10. The clock time may be stored in a shared memory, which may be a data store that is accessible across multiple processes, threads, or other operations on the processing node so that it can be read and used to perform MVCC and update/assign times as discussed above. In some embodiments, the time can be stored in "non-memory" data stores, such as persistent storage devices, which may be block addressable as opposed to byte-addressable memory devices. Although not depicted, if the clock time is already the same or greater than the snapshot time, then the clock time may not be updated (as discussed above with regard to FIG. 1).

As indicated at 1240, one version may be selected out of multiple versions of a tuple stored in the database table to use for performing the access request according to the snapshot time for performing the access request, in some embodiments. For example, as discussed above with regard to FIGS. 7 through 11, various visibility rules may be applied based on the snapshot time, as well as the clock time stored for performing requests. In some embodiments, a status of transactions (as depicted in FIG. 11) may also be used to determine whether a version of a tuple is visible. If a tuple is not visible, then a latest "visible" tuple may be used (if more than one visible tuple is maintained as part of MVCC).

For example, given that a clock time for performing access requests at a database node may be increasing, visibility rules can be applied as follows. If a read request with a snapshot time [E,L] is trying to evaluate an individual data item version (e.g., a tuple) for visibility, then visibility rules may be described as:

1. update the in memory timestamp with the transaction snapshot time stamp with max(access request snapshot time, now( ).latest, shared-mem's latest, TimeSync.latest)
2. Acquire engine transaction id ("xid") based snapshot (only if needed)
3. Access request (e.g., read/write) performing to read a tuple. It needs to decide whether this tuple is visible or not.
   a. Assume transaction T1 had created a tuple. example of mvcc:

--- i. if T1 is in-progress & not prepared => not visible
ii. if T1 is in-progress & is in committing state then do below:
   1. if T1's commit-time is less than R's latest
      a. T1 is still in-progress in clog then wait for T1 to commit or abort.
      b. T1 is committed in clog then tuple is visible.
      c. T1 is aborted then tuple is not visible
   2. if T1's commit-time is greater than R's latest then tuple is not visible
iii. If T1 is in prepared state then check with coordinator
   1. If T1 is not in-progress:
      a. if T1 committed then it can perform mvcc based on T1 commit-time
      b. if T1 is aborted then it's not visible.
   2. if T1 is still in-progress on coordinator => in-visible
iv. if T1 is committed
   1. if T1 commit-time < snapshot time => visible
   2. else not visible
v. if T1 is aborted => no visible

---

Figure 13:
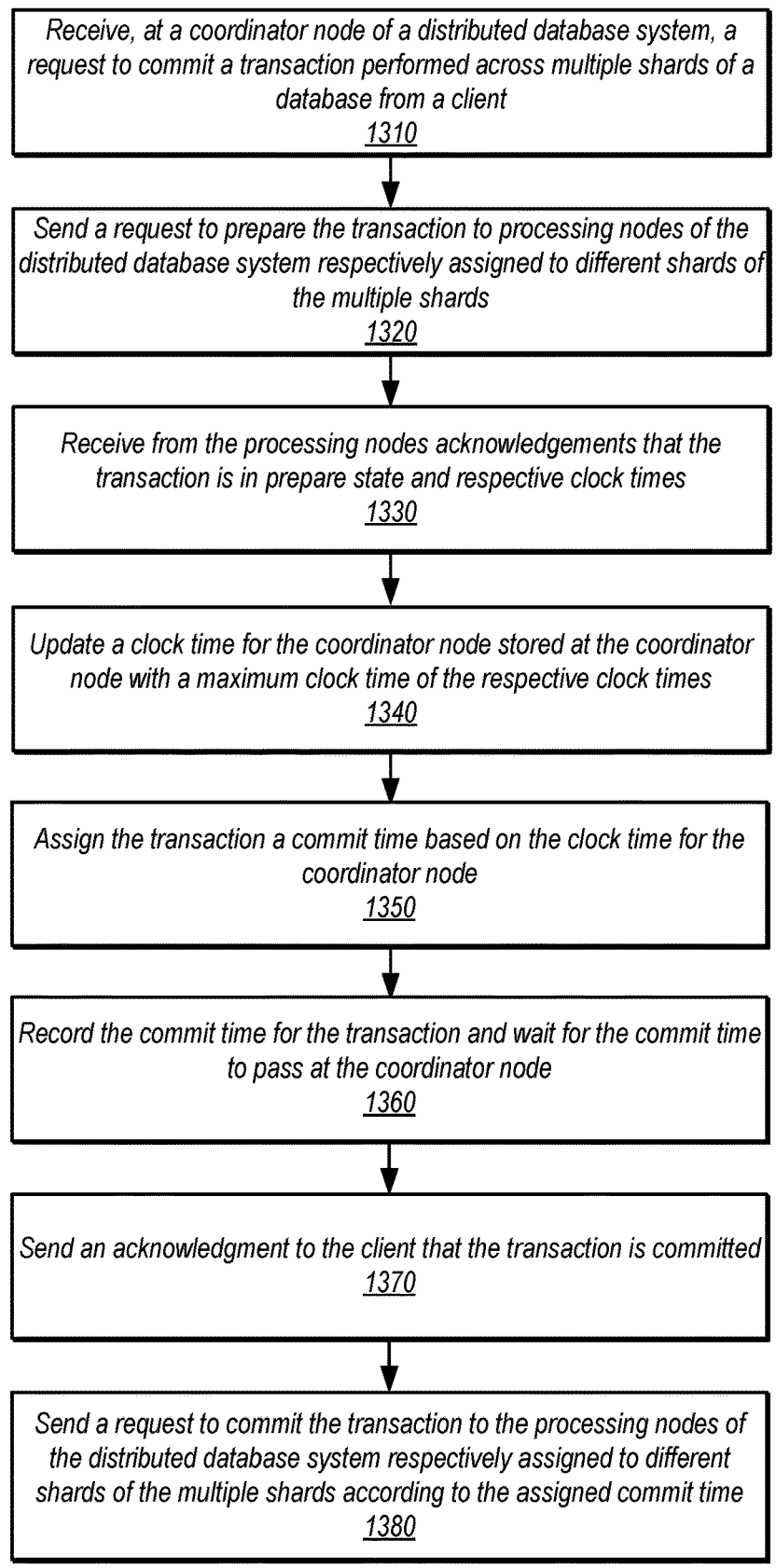
FIG. 13 is a high-level flowchart illustrating various methods and techniques to global read after write consistency for a distributed transaction with increasing commit times at database shards, according to some embodiments.

FIG. 13 is a high-level flowchart illustrating various methods and techniques to global read after write consistency for a distributed transaction with increasing commit times at database shards, according to some embodiments.

As indicated at 1310, a coordinator node of a distributed database system may receive a request to commit a transaction performed across multiple shards of a database from a client, according to some embodiments. In some embodiments, a coordinator node may be similar to a request router, as discussed above with regard to FIGS. 3-11.

As indicated at 1320, a request to prepare the transaction may be sent to processing nodes of the distributed database system respectively assigned to different shards of the multiple shards, according to some embodiments. As indicated at 1330, acknowledgements may be received from the processing nodes that the transaction is in prepare state and respective clock times, according to some embodiments.

As indicated at 1340, a clock time for the coordinator node stored at the coordinator node may be updated with a maximum clock time of the respective clock times, according to some embodiments. As indicated at 1350, the transaction may be assigned a commit time based on the clock time for the coordinator, according to some embodiments. As indicated at 1360, the commit time for the transaction may be recorded and the coordinator node may wait for the commit time to pass, according to some embodiments. As indicated at 1370, an acknowledgment may be sent to the client that the transaction is committed, according to some embodiments. As indicated at 1380, a request to commit the transaction may be sent to the processing nodes of the distributed database system respectively assigned to different shards of the multiple shards according to the assigned commit time, according to some embodiments.

The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 14:
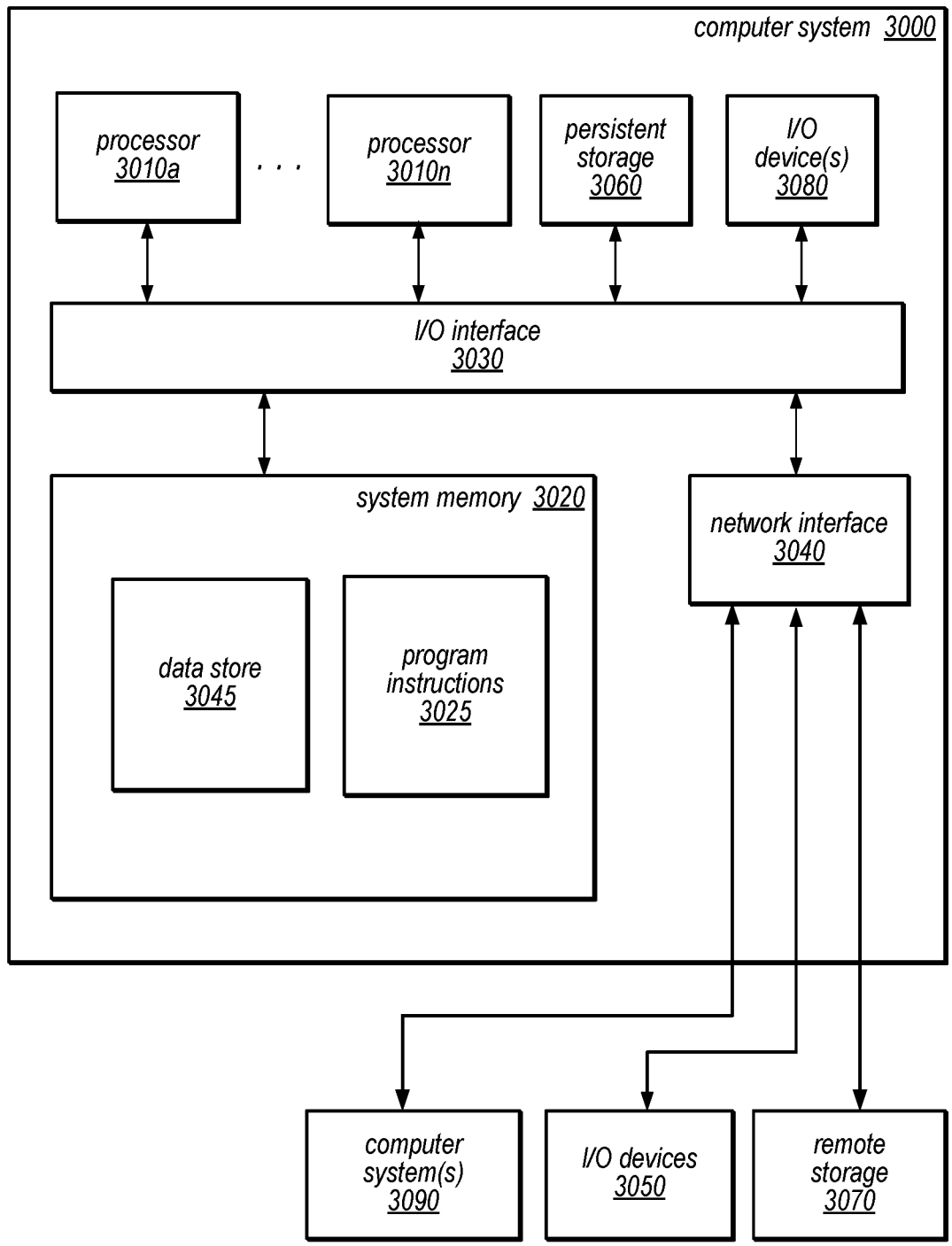
FIG. 14 is a block diagram illustrating an example computer system, according to various embodiments.

FIG. 14 is a block diagram illustrating an example computer system that may implement the various techniques discussed above with regard to FIGS. 1-13, according to various embodiments described herein. For example, computer system 3000 may implement a data processing node, router, and/or a storage node of a separate storage system that stores database tables and associated metadata on behalf of clients of the database tier, in various embodiments. Computer system 3000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 3000 includes one or more processors 3010 (any of which may include multiple cores, which may be single or multi-threaded) coupled to a system memory 3020 via an input/output (I/O) interface 3030. Computer system 3000 further includes a network interface 3040 coupled to I/O interface 3030. In various embodiments, computer system 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. The computer system 3000 also includes one or more network communication devices (e.g., network interface 3040) for communicating with other systems and/or components over a communications network (e.g. Internet, LAN, etc.). For example, a client application executing on system 3000 may use network interface 3040 to communicate with a server application executing on a single server or on a cluster of servers that implement one or more of the components of the database systems described herein. In another example, an instance of a server application executing on computer system 3000 may use network interface 3040 to communicate with other instances of the server application (or another server application) that may be implemented on other computer systems (e.g., computer systems 3090).

In the illustrated embodiment, computer system 3000 also includes one or more persistent storage devices 3060 and/or one or more I/O devices 3080. In various embodiments, persistent storage devices 3060 may correspond to disk drives, tape drives, solid state memory, other mass storage devices, or any other persistent storage device. Computer system 3000 (or a distributed application or operating system operating thereon) may store instructions and/or data in persistent storage devices 3060, as desired, and may retrieve the stored instruction and/or data as needed. For example, in some embodiments, computer system 3000 may host a storage system server node, and persistent storage 3060 may include the SSDs attached to that server node.

Computer system 3000 includes one or more system memories 3020 that may store instructions and data accessible by processor(s) 3010. In various embodiments, system memories 3020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 3020 may contain program instructions 3025 that are executable by processor(s) 3010 to implement the methods and techniques described herein (e.g., various features of fine-grained virtualization resource provisioning for in-place database scaling). In various embodiments, program instructions 3025 may be encoded in native binary, any interpreted language such as Java™ byte-code, or in any other language such as C/C++, Java™, etc., or in any combination thereof. In some embodiments, program instructions 3025 may implement multiple separate clients, server nodes, and/or other components.

In some embodiments, program instructions 3025 may include instructions executable to implement an operating system (not shown), which may be any of various operating systems, such as UNIX, LINUX, Solaris™, MacOS™, Windows™, etc. Any or all of program instructions 3025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 3000 as system memory 3020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 3040.

In some embodiments, system memory 3020 may include data store 3045, which may be configured as described herein. For example, the information described herein as being stored by the database tier (e.g., on a primary node), such as a transaction log, an undo log, cached page data, or other information used in performing the functions of the database tiers described herein may be stored in data store 3045 or in another portion of system memory 3020 on one or more nodes, in persistent storage 3060, and/or on one or more remote storage devices 3070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 3045 or in another portion of system memory 3020 on one or more nodes, in persistent storage 3060, and/or on one or more remote storage devices 3070, at different times and in various embodiments. Similarly, the information described herein as being stored by the storage tier (e.g., redo log records, data pages, data records, and/or other information used in performing the functions of the distributed storage systems described herein) may be stored in data store 3045 or in another portion of system memory 3020 on one or more nodes, in persistent storage 3060, and/or on one or more remote storage devices 3070, at different times and in various embodiments. In general, system memory 3020 (e.g., data store 3045 within system memory 3020), persistent storage 3060, and/or remote storage 3070 may store data blocks, replicas of data blocks, metadata associated with data blocks and/or their state, database configuration information, and/or any other information usable in implementing the methods and techniques described herein.

In one embodiment, I/O interface 3030 may coordinate I/O traffic between processor 3010, system memory 3020 and any peripheral devices in the system, including through network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments, some or all of the functionality of I/O interface 3030, such as an interface to system memory 3020, may be incorporated directly into processor 3010.

Network interface 3040 may allow data to be exchanged between computer system 3000 and other devices attached to a network, such as other computer systems 3090 (which may implement one or more storage system server nodes, primary nodes, read-only node nodes, and/or clients of the database systems described herein), for example. In addition, network interface 3040 may allow communication between computer system 3000 and various I/O devices 3050 and/or remote storage 3070. Input/output devices 3050 may, in some embodiments, include one or more display terminals, keyboards, keypads, touchpads, scanning devices, voice or optical recognition devices, or any other devices suitable for entering or retrieving data by one or more computer systems 3000. Multiple input/output devices 3050 may be present in computer system 3000 or may be distributed on various nodes of a distributed system that includes computer system 3000. In some embodiments, similar input/output devices may be separate from computer system 3000 and may interact with one or more nodes of a distributed system that includes computer system 3000 through a wired or wireless connection, such as over network interface 3040. Network interface 3040 may commonly support one or more wireless networking protocols (e.g., Wi-Fi/IEEE 802.11, or another wireless networking standard). However, in various embodiments, network interface 3040 may support communication via any suitable wired or wireless general data networks, such as other types of Ethernet networks, for example. Additionally, network interface 3040 may support communication via telecommunications/telephony networks such as analog voice networks or digital fiber communications networks, via storage area networks such as Fibre Channel SANs, or via any other suitable type of network and/or protocol. In various embodiments, computer system 3000 may include more, fewer, or different components than those illustrated in FIG. 14 (e.g., displays, video cards, audio cards, peripheral devices, other network interfaces such as an ATM interface, an Ethernet interface, a Frame Relay interface, etc.).

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
 a distributed database system that provides access to a database, wherein the distributed database system comprises:
  one or more request routing nodes, respectively comprising a processor and a memory;
  a plurality of database nodes, respectively comprising a further processor and a further memory, wherein individual ones of the plurality of database engine nodes are respectively assigned to different shards of the database;
 wherein a first one of the one or more request routing nodes is configured to:
  receive a request to access the database;
  determine one or more of the shards to perform the request;
  determine a snapshot time for the request to access the database according to a time synchronization service, wherein the snapshot time is described according to a range of time, wherein the range of time is specified starting from an earliest timestamp and ending with a latest timestamp;
  send the request to the respectively assigned database nodes of the determined one or more shards along with the snapshot time;
 wherein the respectively assigned database nodes of the determined one or more shards are configured to:
  receive the request to access the database and the snapshot time;
  determine that that the latest timestamp in the range of time that describes the snapshot time is greater than a current timestamp in a clock time stored in a shared memory accessible for performing requests received from the one or more request routing nodes;
  responsive to the determination, update the clock time in the shared memory to store the latest timestamp in the range of time;
  select one version of a plurality of versions of a tuple stored in the shard of the database to use for performing the access request according to the snapshot time for performing the request; and
  return a response to the first one of the one or more request routing nodes according to the performance of the request based, at least in part, on using the selected one version of the plurality of versions of the tuple.

2. The system of claim 1, wherein the access request is part of a transaction, and wherein the request router is further configured to:
 receive a request to commit the transaction from a client;
 send to the respectively assigned database nodes a request to prepare the transaction;
 update a clock time for the request router stored in a request router shared memory according to a greatest one of respective clock times received from the respectively assigned database nodes as part of acknowledging the prepare statement;
 assign, based on the clock time stored in the request router shared memory, a transaction commit time for the transaction;
 after waiting for the transaction commit time to pass:

send an acknowledgment of the transaction to the client; and send a request to commit the transaction according to the assigned commit time to the respectively assigned database nodes.

3. The system of claim 1, wherein to select one version of a plurality of versions of a tuple stored in the shard of the database to use for performing the access request according to the snapshot time for performing the request, the one or more database nodes are configured to determine that a transaction associated with the one version of the tuple is in a committing state and that the earlies time of the snapshot time occurs before a committed time for the associated transaction.

4. The system of claim 1, wherein the distributed database system is a database service, wherein data for the database is stored in a separate storage service that is accessed by the plurality of database nodes, and wherein the access request is directed to a table of the database that is enabled as a system-managed table.

5. A method, comprising:
receiving, at a processing node of a database system assigned to a database, an access request for the database from a client;
determining, by the processing node, a snapshot time for performing the access request, wherein the snapshot time is described as a range of time, wherein the range of time is specified starting from an earliest timestamp and ending with a latest timestamp;
updating, by the processing node, a clock time for the processing node for performing requests received from a plurality of clients at the processing node, including the client, to store the latest timestamp in the range of time, based on a determination that the latest timestamp in the range of time is greater than a current timestamp in the clock time; and
selecting, by the processing node, one version of a plurality of versions of a tuple stored in the database to use for performing the access request according to the snapshot time for performing the access request.

6. The method of claim 5, wherein the access request is part of a transaction and wherein the method further comprises:
performing, by a coordinator node that sent the access request to the processing node:
receiving a request to commit the transaction from a client;
sending to a plurality of processing nodes, including the processing node, a request to prepare the transaction;
updating a clock time for the coordinator node stored at a coordinator node according to a greatest one of respective clock times received from the plurality of processing nodes as part of acknowledging the prepare statement;
assign, based on the clock time stored at the coordinator, a transaction commit time for the transaction;
after waiting for the transaction commit time to pass:
sending an acknowledgment of the transaction to the client; and
sending a request to commit the transaction according to the assigned commit time to the plurality of processing nodes.

7. The method of claim 5, wherein the access request is received from a client of the database system.

8. The method of claim 5, further comprising:
wherein the access request is a write request;
performing the write request according to the selected one version of the tuple;
determining a commit time for the write request based, at least in part, on the clock time; and
returning an acknowledgement of the write request and the commit time.

9. The method of claim 5, wherein selecting one version of the plurality of versions of a tuple stored in the database to use for performing the access request according to the snapshot time for performing the request comprises determining that a transaction associated with the one version of the tuple is in a "before committing" state and waiting until the transaction state changes to "committed" to select the tuple.

10. The method of claim 5, wherein selecting one version of the plurality of versions of a tuple stored in the database to use for performing the access request according to the snapshot time for performing the request comprises obtaining a transaction state for a transaction associated with the one version of the tuple.

11. The method of claim 5, wherein selecting one version of the plurality of versions of a tuple stored in the database to use for performing the access request according to the snapshot time for performing the request comprises determining that a transaction associated with the one version of the tuple is in a committing state and verifying prior to completing the access request that the associated transaction has changed to a "committed" state, and wherein determining that the earliest time of the snapshot time occurs before a committed time for the associated transaction.

12. The method of claim 5, wherein the access request is a read request.

13. The method of claim 5, wherein determining the snapshot time for performing the access request comprises extracting the snapshot time from the access request.

14. One or more non-transitory, computer-readable storage media, storing program instructions that when executed on or across one or more computing devices cause the one or more computing devices to implement:
receiving, at a processing node of a distributed database system assigned to a shard of a database, an access request for the shard of the database from a client, wherein the request comprises a range of time, wherein the range of time is specified starting from an earliest timestamp and ending with a latest timestamp that describes a snapshot time for performing the access request;
determining, by the processing node, that that the latest timestamp in the range of time is greater than a current timestamp in a clock time stored in a shared memory accessible for performing requests received from a plurality of clients at the processing node, including the client;
responsive to the determining, updating, by the processing node, the clock time for the processing node in the shared memory to store the latest timestamp in the range of time; and
selecting, by the processing node, one version of a plurality of versions of a tuple stored in the shard of the database to use for performing the access request according to the snapshot time for performing the access request.

15. The one or more non-transitory, computer-readable storage media of claim 14, storing further programming instructions that when executed, cause the one or more computing devices to further implement:
wherein the access request is a write request;

performing the write request according to the selected one version of the tuple;

determining a commit time for the write request based, at least in part, on the clock time in the shared memory; and returning an acknowledgement of the write request and the commit time to a coordinator node that sent the write request, causing the coordinator node to wait until the commit time passes at the coordinator node.

16. The one or more non-transitory, computer-readable storage media of claim 14, wherein the access request is a read request.

17. The one or more non-transitory, computer-readable storage media of claim 14, wherein, in selecting one version of the plurality of versions of a tuple stored in the shard of the database to use for performing the access request according to the snapshot time for performing the request, the program instructions cause the one or more computing devices to implement determining that a transaction associated with the one version of the tuple is in a before committing state and waiting until the transaction state changes to committed to select the tuple.

18. The one or more non-transitory, computer-readable storage media of claim 14, wherein, in selecting one version of the plurality of versions of a tuple stored in the shard of the database to use for performing the access request according to the snapshot time for performing the request, the program instructions cause the one or more computing devices to implement obtaining a transaction state for a transaction associated with the one version of the tuple from a coordinator node that sent the access request to the processing node.

19. The one or more non-transitory, computer-readable storage media of claim 14, wherein, in selecting one version of the plurality of versions of a tuple stored in the shard of the database to use for performing the access request according to the snapshot time for performing the request, the program instructions cause the one or more computing devices to implement determining that a transaction associated with the one version of the tuple is in a committing state and that the earliest time of the snapshot time occurs before a committed time for the associated transaction.

20. The one or more non-transitory, computer-readable storage media of claim 14, wherein the distributed database system is a database service, wherein data for the database is stored in a separate storage service that is accessed by the processing node, and wherein the access request is directed to a table of the database that is enabled as a system-managed table.

* * * * *